(12) United States Patent
Matsuyama

(10) Patent No.: US 12,103,445 B2
(45) Date of Patent: Oct. 1, 2024

(54) IMPACT ABSORBING MEMBER

(71) Applicant: NIPPON STEEL CORPORATION, Tokyo (JP)

(72) Inventor: Shuntaro Matsuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 91 days.

(21) Appl. No.: 17/916,316

(22) PCT Filed: Apr. 2, 2021

(86) PCT No.: PCT/JP2021/014397
§ 371 (c)(1),
(2) Date: Sep. 30, 2022

(87) PCT Pub. No.: WO2021/201291
PCT Pub. Date: Oct. 7, 2021

(65) Prior Publication Data
US 2023/0158928 A1   May 25, 2023

(30) Foreign Application Priority Data
Apr. 2, 2020 (JP) ................................. 2020-066976

(51) Int. Cl.
*B60N 2/427* (2006.01)
(52) U.S. Cl.
CPC ................ *B60N 2/42709* (2013.01)
(58) Field of Classification Search
CPC ................................................ B60N 2/42709
See application file for complete search history.

(56) References Cited

U.S. PATENT DOCUMENTS

| | | | |
|---|---|---|---|
| 3,938,627 A | 2/1976 | Nagazumi | |
| 5,211,694 A * | 5/1993 | Sakakida | B60R 22/341 188/374 |
| 8,573,372 B2 * | 11/2013 | Humfeldt | B60R 22/28 188/374 |
| 9,827,947 B2 * | 11/2017 | Jaradi | B60R 22/28 |
| 2015/0042133 A1 | 2/2015 | Munemura et al. | |
| 2017/0016504 A1 | 1/2017 | Braun et al. | |

FOREIGN PATENT DOCUMENTS

| | | |
|---|---|---|
| JP | 48-82619 U | 10/1973 |
| JP | 2011-85156 A | 4/2011 |
| JP | 2013-67238 A | 4/2013 |
| JP | 2017-517659 A | 6/2017 |

* cited by examiner

*Primary Examiner* — Anthony D Barfield
(74) *Attorney, Agent, or Firm* — Birch, Stewart, Kolasch & Birch, LLP

(57) ABSTRACT

An impact absorbing member able to absorb the energy at the time of impact using a smaller space is provided. The impact absorbing member 10 comprises a sheet member 12 having bent parts 12a and a plurality of sheet parts 12b connected through the bent parts 12a and a restraining member 14 restraining the plurality of sheet parts 12b, the plurality of sheet parts 12b being superposed in a state folded back at the bent parts 12a in a first direction, the restraining member 14 restraining the superposed plurality of sheet parts 12b from both sides in a second direction, the first direction being a direction connecting one end part 12c among two end parts 12c of the sheet member 12 and the bent part 12a adjoining the sheet part at which the end part 12c is positioned, the second direction being a direction perpendicular to the first direction.

6 Claims, 18 Drawing Sheets

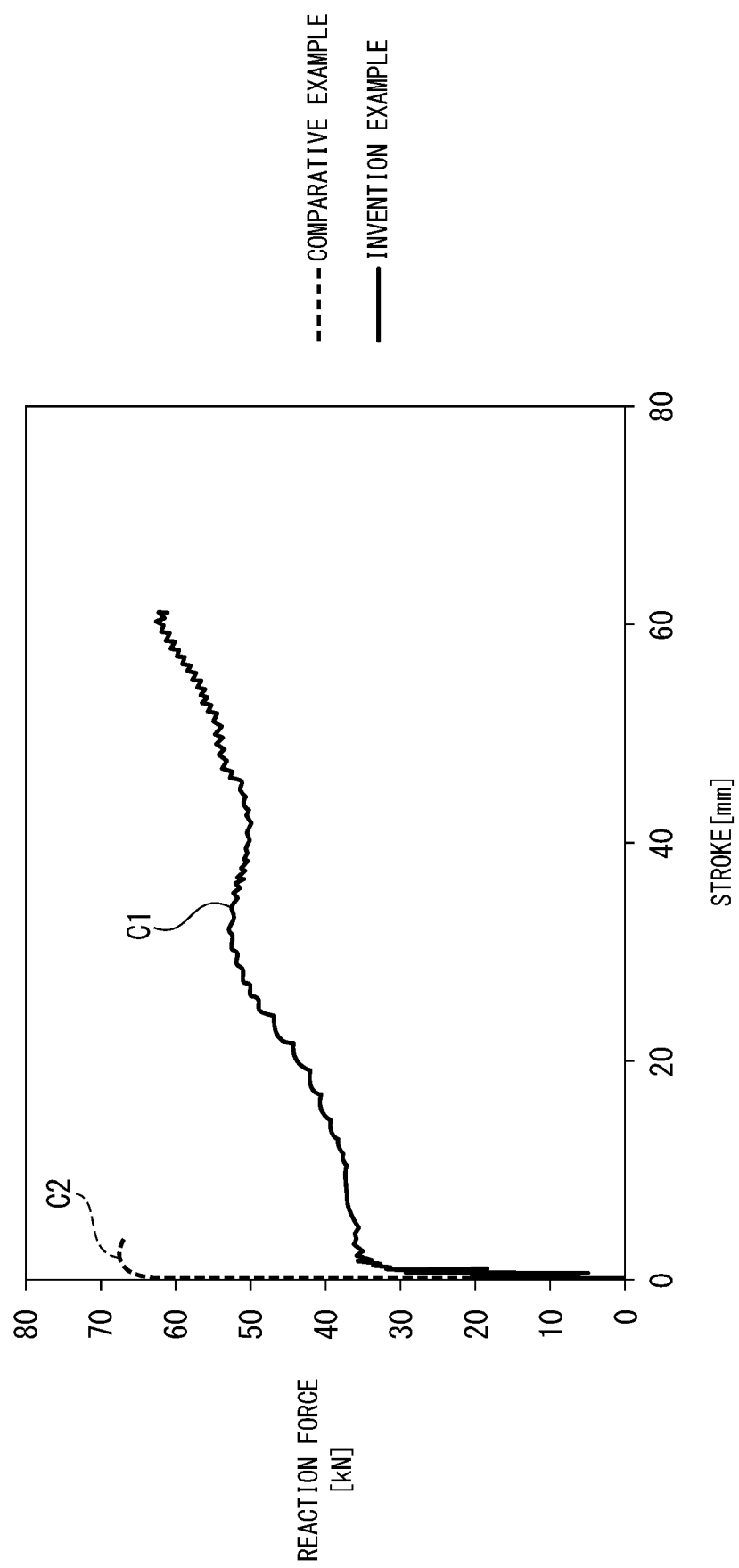

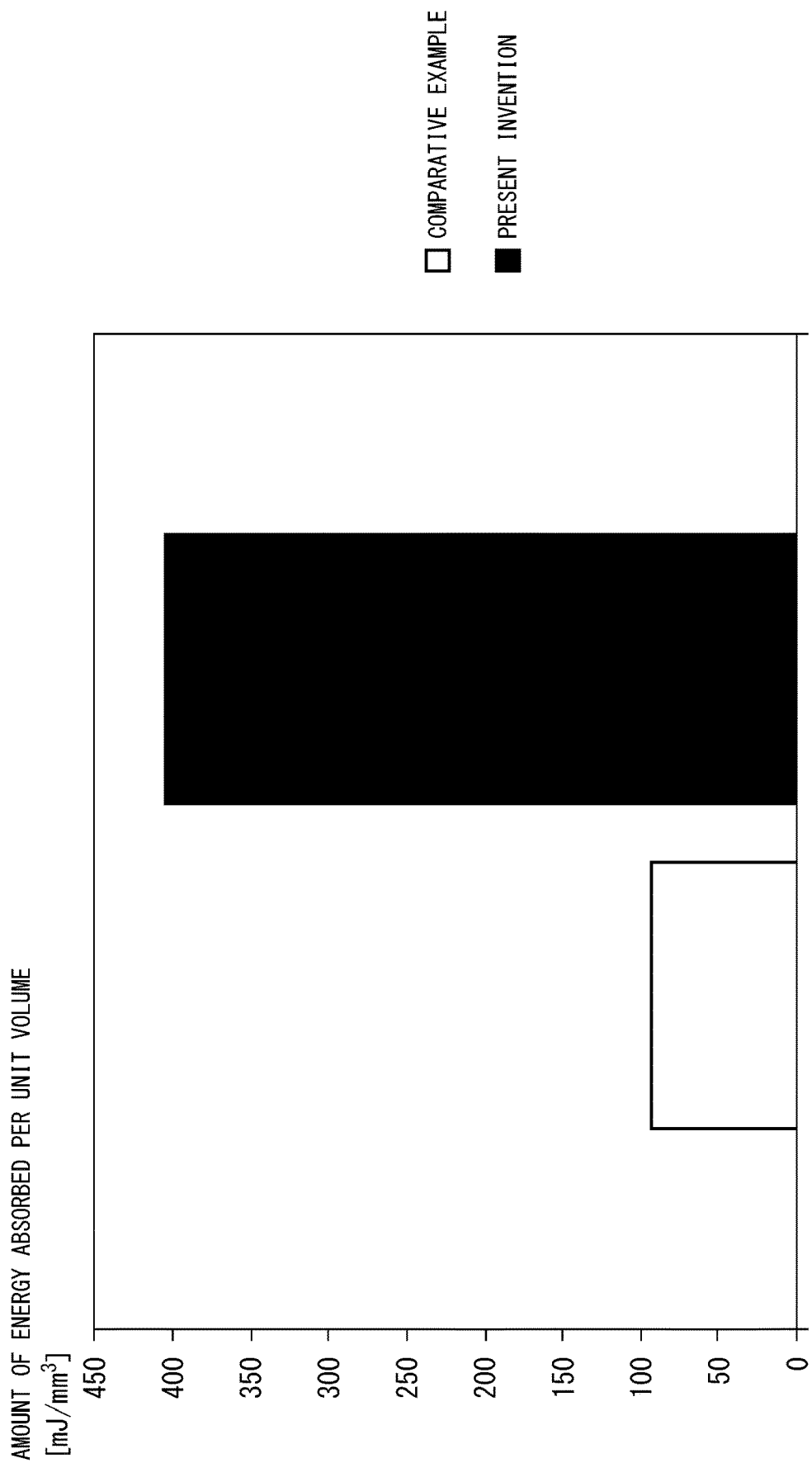

IMPACT ABSORBING MEMBER

FIELD

The present invention relates to an impact absorbing member.

BACKGROUND

In recent times, improvement of impact safety at the time of impact of an automobile has been proactively promoted along with lightening of weight for improving the fuel economy of vehicles. For example, the following PTL 1 describes an impact absorbing member continuously undergoing bending deformation due to an impact load and absorbing impact energy by a smaller load amplitude while reducing the maximum load at that time.

CITATIONS LIST

Patent Literature

[PTL 1] Japanese Unexamined Patent Publication No. 2011-85156

SUMMARY

Technical Problem

Impact absorbing members used for vehicles are designed to be provided at various locations of vehicles. The impact absorbing member described in PTL 1 is configured from a tubular member. Impact energy is absorbed by continuous bending deformation increasing the length of a folded back part where the outer wall is folded back due to an impact load. In such a constitution, there is the problem that the impact absorbing member is a closed cross-section 3D structure and the 3D space occupied becomes large, so if the space cannot be sufficiently secured, the impact absorbing member cannot be installed.

Therefore, the present invention has as its object the provision of an impact absorbing member able to absorb the energy at the time of an impact using a smaller space.

Solution to Problem

The gist of the present disclosure is as follows:
(1) An impact absorbing member comprising
a sheet member having bent parts and a plurality of sheet parts connected through the bent parts and
a restraining member restraining the plurality of sheet parts,
the plurality of sheet parts being superposed in a state folded back at the bent parts in a first direction,
the restraining member restraining the superposed plurality of sheet parts from both sides in a second direction,
the first direction being a direction connecting one end part among two end parts of the sheet member and the bent part adjoining the sheet part at which the end part is positioned,
the second direction being a direction perpendicular to the first direction.
(2) The impact absorbing member according to the above (1), wherein
the restraining member is a hollow member, and
the superposed plurality of sheet parts are arranged inside the hollow member.
(3) The impact absorbing member according to the above (1) or (2), wherein
the sheet member has two bent parts and three sheet parts connected through the two bent parts, and
the three sheet parts are superposed in a state alternately folded back at the two bent parts in the first direction.
(4) The impact absorbing member according to the above (3), wherein
the second direction is a thickness direction of the sheet member,
the restraining member has two restraining surfaces restraining the superposed plurality of sheet parts in the second direction,
in the second direction, a clearance "c" of an average value of a clearance of a portion where a sheet part and a restraining surface approach the most in the vicinity of one of the bent parts and a clearance of a portion where a sheet part and a restraining surface approach the most in the vicinity of the other of the bent parts satisfies the following formula (1):

$$c/c^* \le 0.3 \tag{1}$$

when a length in the first direction of a sheet part positioned at the middle in the second direction among the three sheet parts is $l_0$ and, at a bent part, a radius of curvature of a center line of thickness of a sheet part connected to the bent part is "r", $c^* = l_0/2 - r$.
(5) The impact absorbing member according to the above (3) or (4), wherein
the second direction is a thickness direction of the sheet member, and
at the superposed plurality of sheet parts, a clearance c' of inside surfaces of sheet parts facing each other in the second direction satisfies the following formula (2) when an average of the thicknesses of the superposed plurality of sheet parts in the second direction is "t":

$$c'/t \le 0.2 \tag{2}$$

(6) The impact absorbing member according to any one of the above (1) to (5), wherein one of the two end parts of the sheet member is connected to a hinge part supporting a seatback of a vehicular use seat and the other is connected to a side frame of a seat cushion.

Advantageous Effects of Invention

According to the present invention, an impact absorbing member able to absorb the energy at the time of impact using a smaller space is provided.

BRIEF DESCRIPTION OF THE DRAWINGS

FIG. 7 is a graph showing a relationship between a stroke and reaction force when applying a tensile load to an impact absorbing member.

FIG. 8 is a graph showing amounts of energy absorbed per volume for an invention example and comparative example explained in FIG. 7.

DESCRIPTION OF EMBODIMENTS

Figure 1:
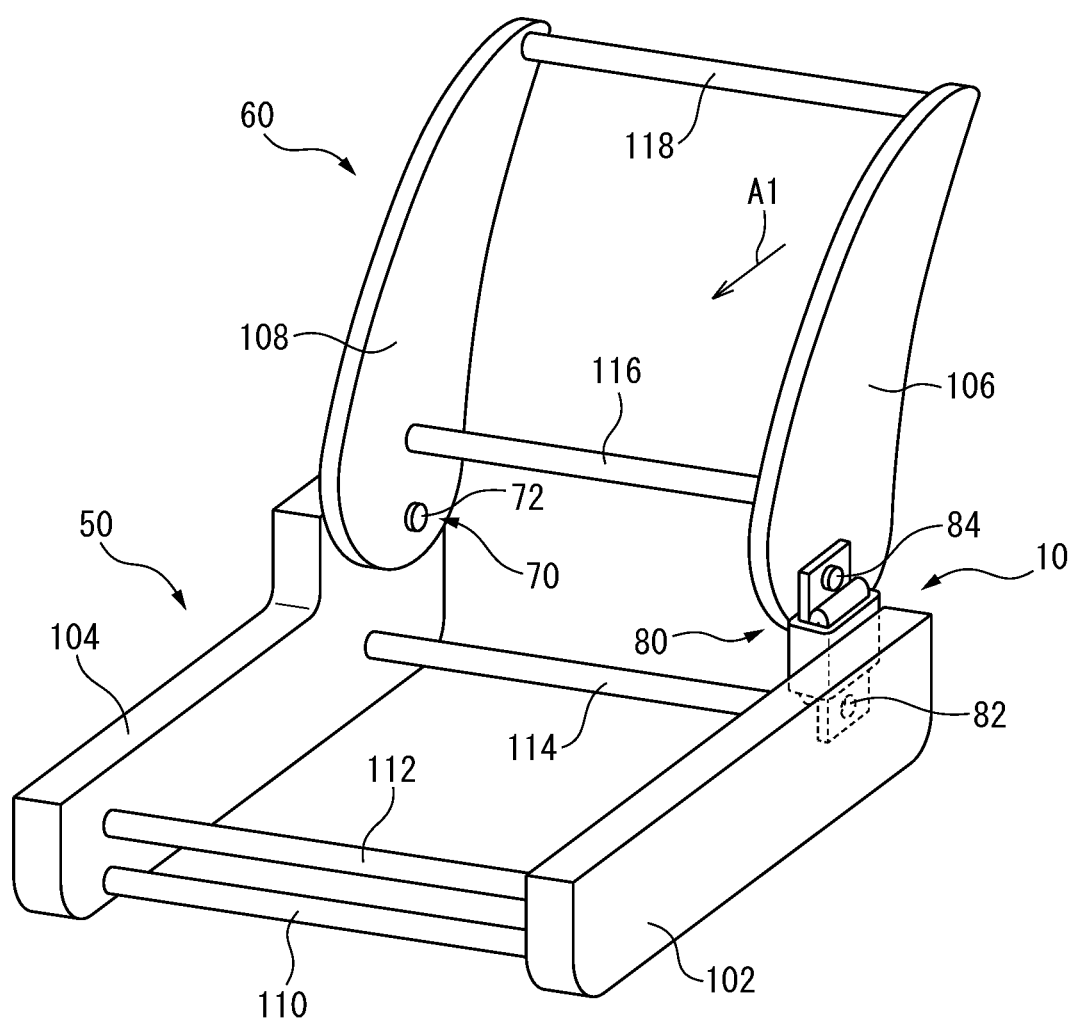
FIG. 1 is a schematic view showing the configuration of a vehicle seat to which an impact absorbing member according to one embodiment of the present invention is applied.

Below, an impact absorbing member according to an embodiment of the present invention will be explained with reference to the drawings. First, referring to FIG. 1, the configuration of a vehicular seat 100 to which this impact absorbing member is applied will be explained. FIG. 1 is a schematic view showing the configuration of the vehicular seat 100. The vehicular seat 100 is, for example, used as a driver's seat or navigator's seat.

The vehicular seat 100 has a seat cushion 50 forming a sitting part and a seatback 60 forming a back rest. The seat cushion 50 is supported on a vehicle floor through a pair of left and right side rails (not shown) etc. installed on the floor.

Note that, FIG. 1 schematically shows a frame part of the vehicular seat 100 having the seat cushion 50 and the seatback 60. The vehicular seat 100 is configured by these members plus foam rubber or other inside packing and leather or fabric or other outside covering.

The seat cushion 50 has a side frame 102 and a side frame 104 provided at the left and right. The side frame 102 and the side frame 104 are connected and form an integral unit by a connecting member 110, connecting member 112, and connecting member 114 extending in a vehicle width direction.

The seatback 60 has a side frame 106 and a side frame 108 provided at the left and right. The side frame 106 and the side frame 108 are connected and form an integral unit by a connecting member 116 and connecting member 118 extending in the vehicle width direction.

The seat cushion 50 and the seatback 60 are connected by a left and right hinge part 70 and hinge part 80. Due to the seat cushion 50 and the seatback 60 being connected by the hinge parts 70, 80, an angle of the seatback 60 with respect to the seat cushion 50 can be changed about the hinge parts 70, 80. Due to this, a reclining function of the vehicular seat 100 is realized.

The hinge part 70 and the hinge part 80 differ in structure. Giving as an example the case where the vehicular seat 100 is a seat at a driver's seat side of a right hand steering wheel vehicle, the hinge part 70 at the right side when facing the front of the vehicle is configured so that the side frame 108 of the seatback 60 can pivot with respect to the side frame 104 of the seat cushion 50 about a shaft 72 extending in the vehicle width direction as a center of rotation.

On the other hand, at the hinge part 80 at the left side when facing the front of the vehicle, the side frame 106 of the seatback 60 is connected with the side frame 102 of the seat cushion 50 through the impact absorbing member 10. In more detail, the hinge part 80 is configured so that the impact absorbing member 10 can pivot with respect to the side frame 102 of the seat cushion 50 about the center of rotation of the shaft 82 extending in the vehicle width direction. Further, it is configured so that the side frame 106 of the seatback 60 can pivot with respect to the impact absorbing member 10 about the center of rotation of the shaft 84 extending in the vehicle width direction. In this way, the impact absorbing member 10 has one of the two end parts of the sheet member 12 connected to the hinge part supporting the seatback 60 of the vehicular seat 100 and has the other connected to the side frame 102 of the seat cushion 50.

A reclining device (not shown) for adjusting the angle of the seatback 60 is provided at only the hinge part 70 at the right side when facing the front of the vehicle. The reclining device is, for example, provided with a latch mechanism and fixes the angle of the side frame 108 of the seatback 60 with respect to the side frame 104 of the seat cushion 50 to the angle adjusted to by the user. The side frame 106 and the side frame 108 are integrally connected by the connecting member 116 and the connecting member 118, so if the angle of the side frame 108 with respect to the side frame 104 is fixed by the one hinge part 70, the angle of the side frame 106 with respect to the side frame 102 is also fixed. Due to this, the angle of the seatback 60 with respect to the seat cushion 50 is fixed. By the reclining device being provided at only the one hinge part 70, the number of parts is cut and the production costs are reduced.

Figure 2:
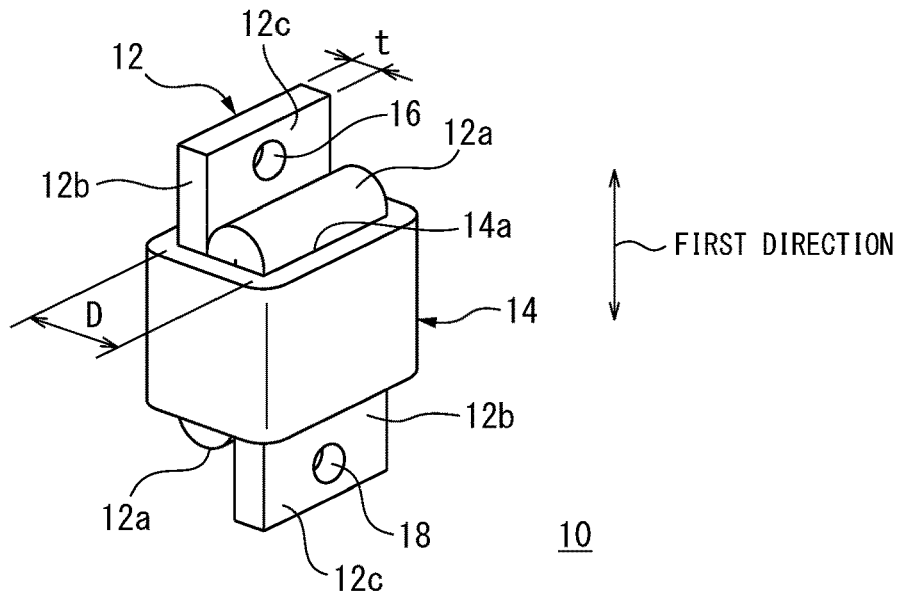
FIG. 2 is a perspective view showing a configuration of an impact absorbing member.
Figure 14:
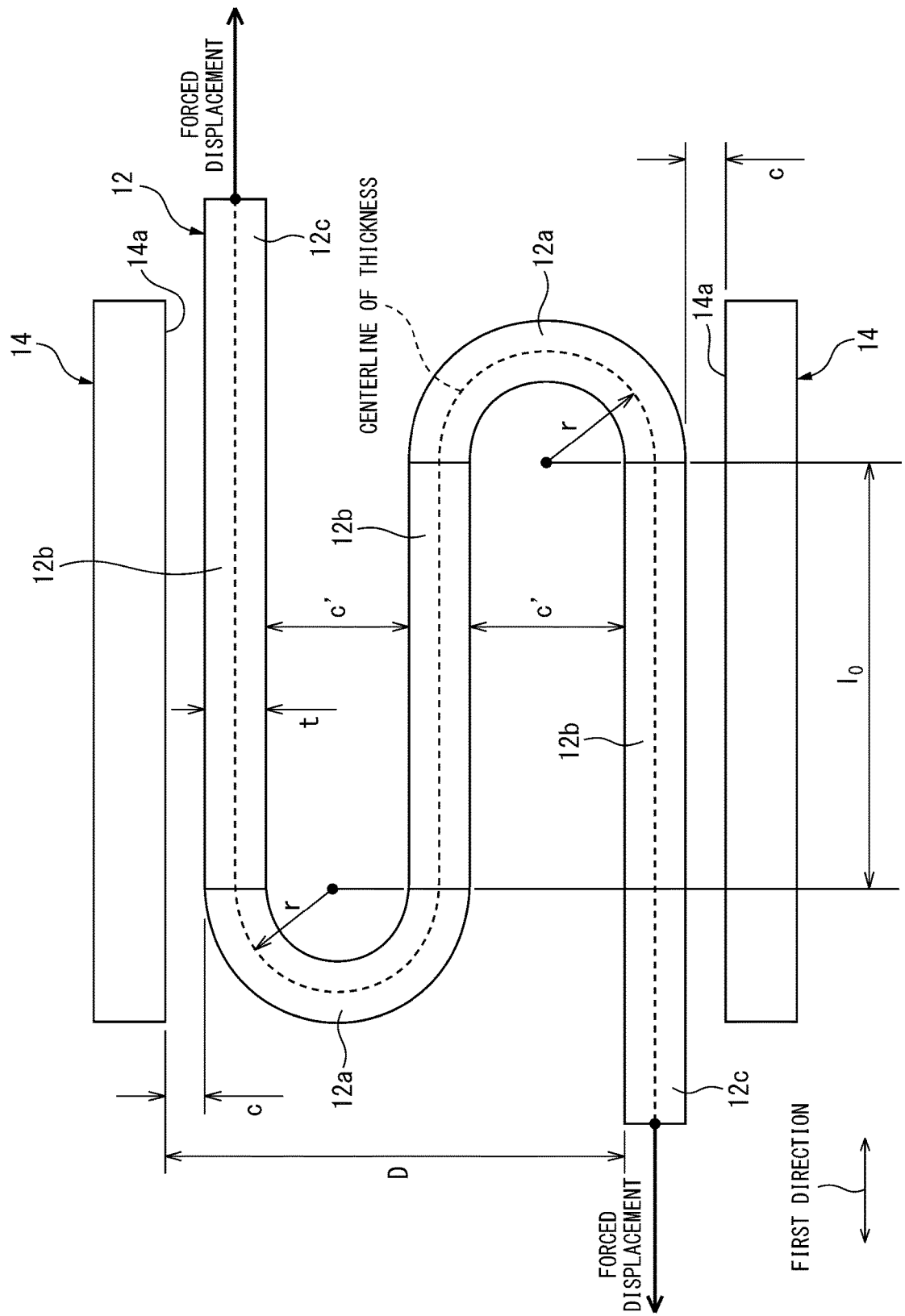
FIG. 14 is a cross-sectional view showing a constitution of an impact absorbing member.

FIG. 2 is a perspective view showing the configuration of the impact absorbing member 10. Further, FIG. 14 is a cross-sectional view showing the configuration of the impact absorbing member 10. The impact absorbing member 10 is provided with the sheet member 12 having bent parts 12a and a plurality of sheet parts 12b connected through the bent parts 12a. The plurality of sheet parts 12b are superposed in a state folded back in the first direction at the bent parts 12a. Further, the impact absorbing member 10 is provided with a restraining member 14 restraining the superposed plurality of sheet parts 12b from the two sides in the second direction. The first direction is a direction connecting one end part 12c among two end parts 12c of the sheet member 12 and the bent part 12a adjoining the sheet part 12b at which the end part 12c is positioned. Note that, the direction connecting the other end part 12c of the sheet member 12 and the bent part 12a adjoining the sheet part 12b at which that end part 12c is positioned preferably matches the first direction. The first direction is designed to match the direction in which it is anticipated that the later explained impact load will be applied. The second direction is a direction perpendicular to the first direction. The second direction preferably includes the thickness direction and width direction of the sheet member 12 (sheet parts 12b). Here, the thickness direction of the sheet member 12 (sheet parts 12b) shows the normal direction with respect to the surface of the sheet parts 12b (also referred to as the direction perpendicular to the surface). The width direction of the sheet member 12 (sheet parts 12b) corresponds to the width direction of the sheet parts 12b and shows the direction perpendicular to the first direction and thickness direction. The restraining member 14 restrains (limits) movement of the sheet parts 12b in the second direction to thereby efficiently transmit the impact load applied to an end part 12c of the sheet member 12 in the first direction. In particular, the sheet parts 12b are planar shapes, so restraint of the sheet parts 12b with respect to the thickness direction where deformation is easy is effective for absorbing the impact load. Here, "restraint of the sheet parts 12b from the two sides in the second direction" indicates limiting the amount of movement of the sheet parts 12b in the second direction. For this reason, the restraining member 14 and the sheet parts 12b may closely contact each other in the second direction or may be in a state in close proximity. However, the distance between the restraining member 14 and the sheet parts 12b in the second direction is preferably made within the later explained distance so as to efficiently absorb the impact load. Note that, FIG. 14 shows a cross-section along the first direction of the impact absorbing member 10.

A vehicle is provided with various impact absorbing structures for absorbing impact at the time of impact. For example, in a front side member or other member forming a vehicle body floor, the space for provision of an impact absorbing structure is relatively easy to secure. On the other hand, in a vehicular seat 100 installed in a vehicle compartment, the space for provision of an impact absorbing structure is extremely limited. Therefore, the size of an impact absorbing member 10 to be provided at the vehicular seat 100 is preferably as small as possible.

In the present embodiment, the impact absorbing member 10 is comprised of a sheet member 12 superposed on itself by being folded back. The thickness of the bent parts 12a or sheet parts 12b of the sheet member 12 is several mm or so. Therefore, the space occupied by the impact absorbing member 10 is kept down. In particular, the space occupied in the thickness direction is kept down. Therefore, the impact absorbing member 10 can be installed even in a narrow clearance etc. and can be reliably housed even in a vehicular seat 100 in which only restricted space can be secured.

In the example shown in FIG. 2, the sheet member 12 is formed by a strip-shaped steel sheet being folded back at two bent parts 12a so that the steel sheet is superposed in three layers. The superposed parts of the strip steel sheet (sheet parts 12b) of the sheet member 12 may closely contact each other or predetermined clearances may be provided between the superposed sheet parts 12b as explained later. Note that, it is sufficient that there be at least one bent part 12a. If there is one bent part 12a, the sheet member 12 is configured by two superposed sheet parts 12b. Further, if there are three bent parts 12a, the sheet member 12 is comprised of four superposed sheet parts 12b. Note that, the sheet member 12 may be comprised of a metal sheet other than a steel sheet.

The restraining member 14 is comprised of a steel tube or other hollow member, for example, is comprised of a square pipe cut short in the longitudinal direction. The restraining member 14 may also be formed in a hollow shape by bending a sheet member. In this case, the bent end parts may be joined by welding etc. or the end parts need not be joined and a clearance may be provided between the end parts. Three superposed sheet parts 12b are placed in the restraining member 14. As shown in FIG. 2 and FIG. 14, the restraining member 14 has two restraining surfaces 14a restraining the three superposed sheet parts 12b in the second direction (thickness direction of sheet parts 12b). The distance D between the two restraining surfaces 14a facing each other at the inside of the restraining member 14 in the thickness direction of the sheet parts 12b is made about three times the average thickness "t" of the three sheet parts 12b. The end parts 12c of the sheet member 12 are preferably provided with a hole 18 in which a shaft 82 is to be inserted and a hole 16 in which a shaft 84 is to be inserted. Note that, if there is a single bent part 12a, the sheet member 12 is comprised of two superposed sheet parts 12b, so the distance D between the two restraining surfaces 14a facing each other at the inside of the restraining member 14 is made about 2 times the average thickness "t" of the two sheet parts 12b. Similarly, if there are three bent parts 12a, the sheet member 12 is comprised of four superposed sheet parts 12b, so the distance D between restraining surfaces 14a facing each other at the inside of the restraining member 14 is made about 4 times the average thickness "t" of the four sheet parts 12b. The restraining surfaces 14a of the restraining member 14 and the outer surface of the sheet member 12 may closely contact each other or as explained later a predetermined clearance may be provided.

Note that, the restraining member 14 restrains the superposed plurality of sheet parts 12b from the two sides in the second direction perpendicular to the first direction. It may also restrain the sheet parts 12b from the two sides in the thickness direction of the sheet member 12 and additionally restrain the sheet parts 12b from the two sides in the width direction of the sheet member 12.

To keep the restraining member 14 from moving with respect to the sheet member 12 in the state where three superposed sheet parts 12b are placed in the restraining member 14, the restraining member 14 and the sheet member 12 may be fixed together by spot welding etc. However, if ending up completely fastening together the restraining member 14 and the sheet member 12, if an impact load is applied, sometimes deformation of the sheet member 12 will be obstructed, so it is preferable to fasten together the restraining member 14 and sheet member 12 by a low strength of an extent where the part breaks in the case where an impact load is applied to the impact absorbing member 10.

Inside the seatback 60, a three-point type of seatbelt device (not shown) is housed. At the time of use of the seatbelt, the body of the seated party is strapped against the seatback 60 by the seatbelt. For this reason, if the vehicle is involved in an impact (front impact) at the time of use of the seatbelt, a large impact load (inertia force) is applied to the seatback 60 in the direction shown by the arrow A1 in FIG. 1. Note that, as a configuration where a three-point type of seatbelt device in housed in the seatback 60, for example, the configuration described in Japanese Unexamined Patent Publication No. 2012-76494 etc. can be applied.

Figure 3:
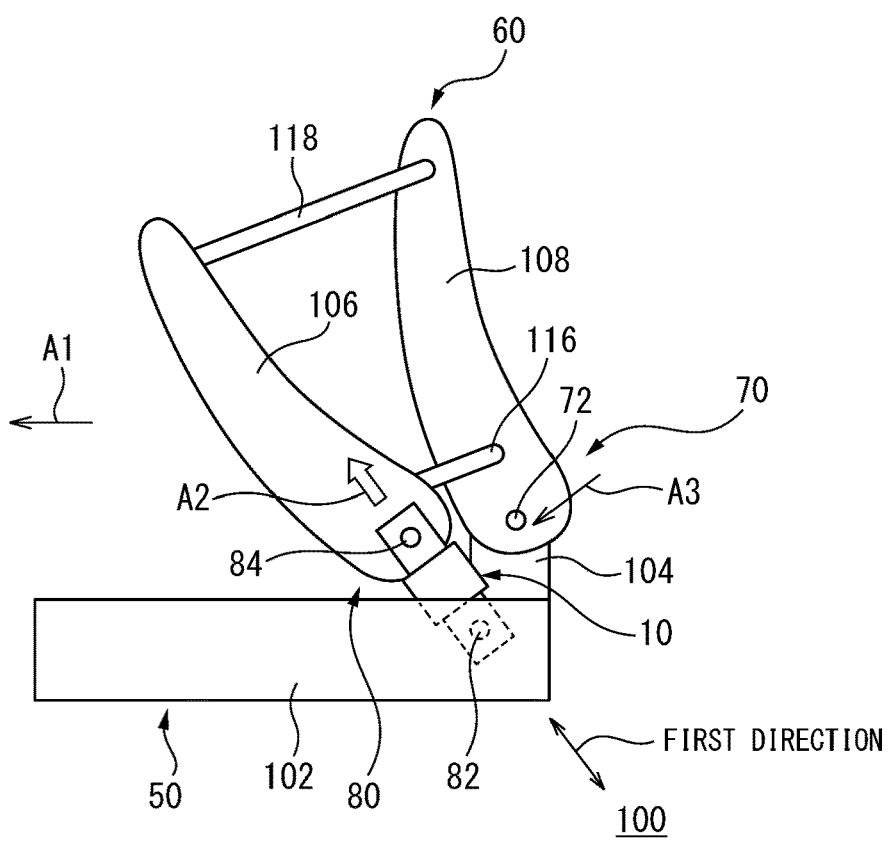
FIG. 3 is a side view of a vehicular seat seen from a left side and a view showing the state where a large load is applied to a seatback in an arrow A1 direction by front impact of a vehicle and where the seatback deforms to the front of the vehicle.

FIG. 3 is a side view of the vehicular seat 100 seen from the left side and a view showing the state where a large load is applied to the seatback 60 in the arrow A1 direction by front impact of a vehicle and where the seatback 60 deforms to the front of the vehicle. In the state shown in FIG. 3, at the hinge part 70 at the right side when facing the front of the vehicle, the angle of the side frame 108 of the seatback 60 with respect to the side frame 104 of the seat cushion 50 is fixed by the reclining device. For this reason, while depending on the magnitude of the load applied, the angle of the side frame 108 to the side frame 104 basically does not greatly change. For this reason, a large acceleration is caused at the side frame 108 at the time of front impact. Note that, in the hinge part 70 as well, a change may occur in the angle of the side frame 108 with respect to the side frame 104 due to a stopper being over ridden in the latch mechanism etc.

On the other hand, in the state shown in FIG. 3, at the hinge part 80 at the left side when facing the front of the vehicle, the angle of the side frame 106 of the seatback 60 with respect to the side frame 102 of the seat cushion 50 is not fixed. Therefore, if a load is applied in the direction of the arrow A1, the angle of the side frame 106 with respect to the side frame 102 will greatly change. Further, if an impact load is applied in the direction of the arrow A1, an impact load in a direction in which the shaft 82 and the shaft 84 move apart (arrow A2 direction shown in FIG. 3) is applied in the first direction and a tensile load is applied to the first direction of the impact absorbing member 10. Note that, in the present embodiment, the example was shown where the shaft 82 and the shaft 84 were inserted into the hole 16 and the hole 18 of the end parts 12c of the sheet member 12 so that the impact absorbing member 10 was connected with other members, but the method of connecting the end parts of the impact absorbing member 10 and other members is not limited to this. For example, they may be connected by welding.

Figure 4:
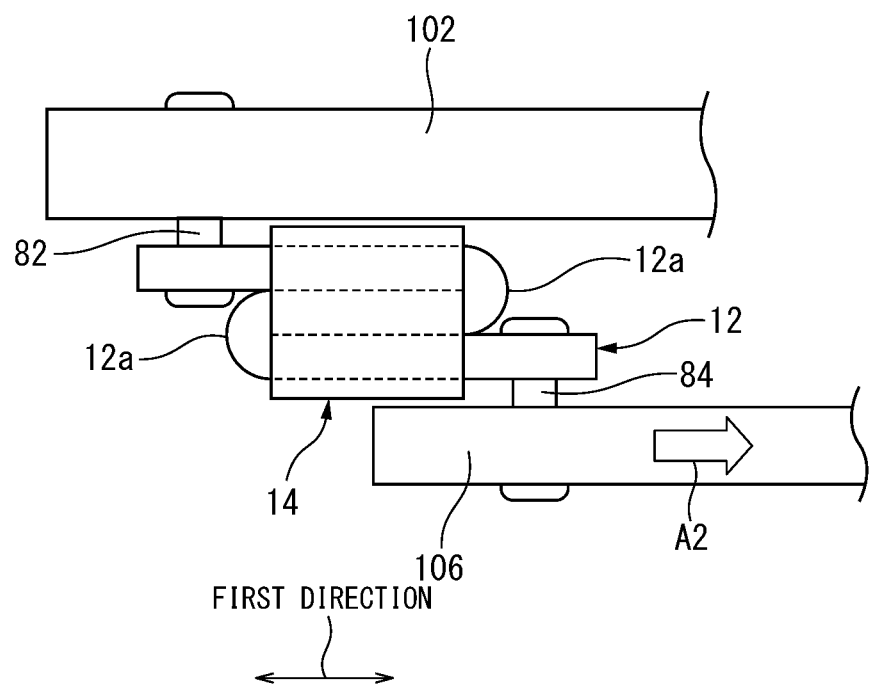
FIG. 4 is a schematic view showing the state of a hinge part seen in an arrow A3 direction in FIG. 3.

FIG. 4 is a schematic view showing the state of the hinge part 80 viewed in the arrow A3 direction in FIG. 3. As shown in FIG. 4, if force in the arrow A2 direction is applied to the side frame 106, since the shaft 84 is inserted in the one hole 16 of the impact absorbing member 10, the force in the arrow A2 direction is transmitted from the shaft 84 to the sheet member 12. The shaft 82 is inserted in the other hole 18 of the impact absorbing member 10, so the shaft 82 is fixed to the side frame 102. Therefore, force acts in a direction where the shaft 82 and the shaft 84 move apart and a tensile load is applied to the impact absorbing member 10.

Figure 5A:
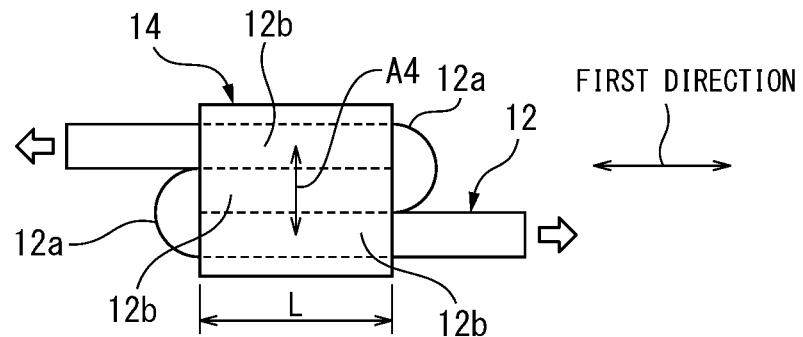
FIG. 5A is a schematic view showing in time series a state of deformation of an impact absorbing member upon receiving a tensile load.
Figure 5B:
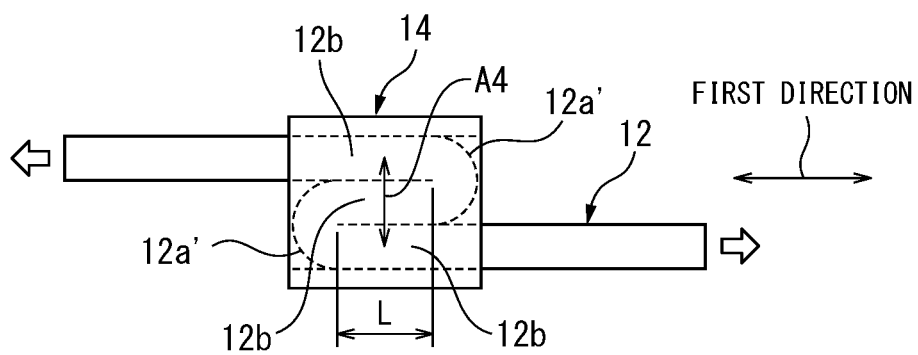
FIG. 5B is a schematic view showing in time series a state of deformation of an impact absorbing member upon receiving a tensile load.
Figure 5C:
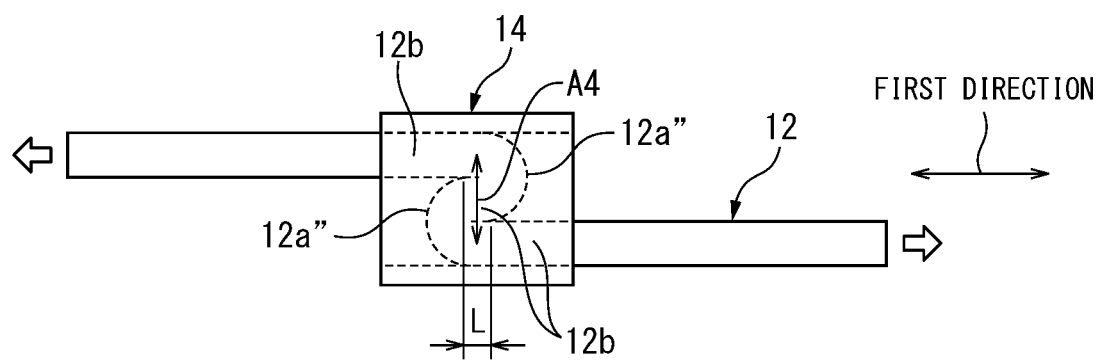
FIG. 5C is a schematic view showing in time series a state of deformation of an impact absorbing member upon receiving a tensile load.

Due to this, the impact absorbing member 10 deforms so that the sheet member 12 is extended in the first direction. FIG. 5A to FIG. 5C are schematic views showing in time series the state of deformation of the impact absorbing member 10 upon receiving a tensile load in the case where there are two bent parts 12a. Note that, in FIG. 5A to FIG. 5C, the bent parts 12a and sheet parts 12b of the sheet member 12 are illustrated from the width direction of the sheet member 12. The length L in the first direction of the sheet part 12b positioned in the middle among the three sheet parts 12b is shown. FIG. 5A shows the state in which a tensile load is applied in the first direction of the impact absorbing member 10. From this state, impact energy starts to be absorbed by the impact absorbing member 10. In the state shown in FIG. 5A, the outer surfaces of the two bent parts 12a of the sheet member 12 are positioned at the outside of the restraining member 14. In the state shown in FIG. 5A, the length L of the sheet part 12b positioned in the middle among the three sheet parts 12b is the same extent as the length of the restraining member 14.

FIG. 5B shows the state of deformation of the sheet member 12 due to a tensile load being applied in the first direction of the impact absorbing member 10. In this state, the two bent parts 12a of the sheet member 12 shown in FIG. 5A are extended and the outer surfaces of the newly formed bent parts 12a' enter the inside of the restraining member 14. In the state shown in FIG. 5B, the length L of the sheet part 12b positioned in the middle among the three sheet parts 12b becomes shorter than the length of the restraining member 14.

FIG. 5C shows the state of further deformation of the sheet member 12 from the state shown in FIG. 5B due to a tensile load being applied in the first direction of the impact absorbing member 10. In this state, the two bent parts 12a' of the sheet member 12 shown in FIG. 5B are extended and the positions of the newly formed bent parts 12a" enter the inside of the restraining member 14 further than the bent parts 12a' of FIG. 5B. In the state shown in FIG. 5C, the length L of the sheet part 12b positioned in the middle among the three sheet parts 12b becomes further shorter than FIG. 5B.

As explained above, in the process shown in FIG. 5A, FIG. 5B, and FIG. 5C, the sheet member 12 of the impact absorbing member 10 is extended whereby the length L of a portion where the sheet member 12 is superposed by being folded back (sheet part 12b positioned in the middle among the three sheet parts 12b) decreases. At this time, the two bent parts are extended and new bent parts are formed adjoining the original bent parts. By repetition of this, the locations forming the two bent parts move in the first direction of the sheet member 12 toward the inside of the restraining member 14. That is, the deformation of the sheet member 12 is propagated in the first direction and the deformation spreads to the entire region of the sheet member 12, so deformation in a direction outside the planes of the bent parts (thickness direction of sheet member 12) is suppressed. Note that, in the state before application of an impact load, the lower limit L of the sheet part 12b positioned in the middle of the three sheet parts 12b is preferably made about the thickness of the steel sheet forming the sheet member 12 for securing the ability of the locations of the bent parts to move in the first direction.

Here, as explained above, the distance D between the two restraining surfaces 14a facing each other at the inside of the restraining member 14 is made about 3 times the average thickness "t" of the plurality of sheet parts 12b. In the thickness direction of the sheet member 12, the sheet member 12 and the restraining member 14 are engaged. Due to this engaged state, in the process of application of an impact load and movement of the locations forming the bent parts in the first direction toward the inside of the restraining member 14, deformation of the superposed sheet member 12 in the thickness direction (arrow A4 direction shown in FIGS. 5A to 5C) is suppressed by the restraining member 14. Therefore, the sheet member 12 will not deform so as to spread in the thickness direction. The locations forming the two bent parts deform so as to move in the first direction toward the inside of the restraining member 14. Due to this, the tensile load applied to the first direction of the impact absorbing member 10 is reliably absorbed.

Figure 6A:
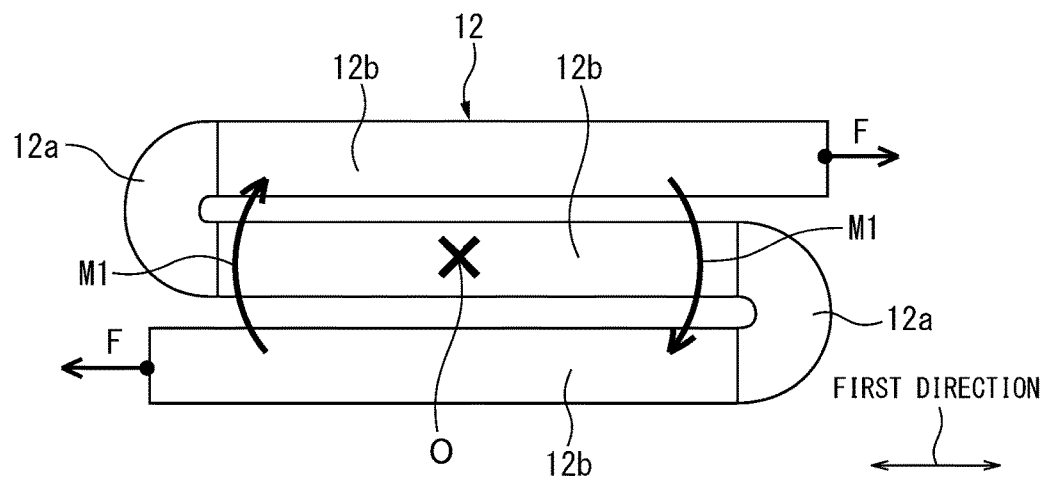
FIG. 6A is a schematic view showing a state of deformation of a sheet member if a tensile load is applied in a first direction of an impact absorbing member if a restraining member is not provided.
Figure 6B:
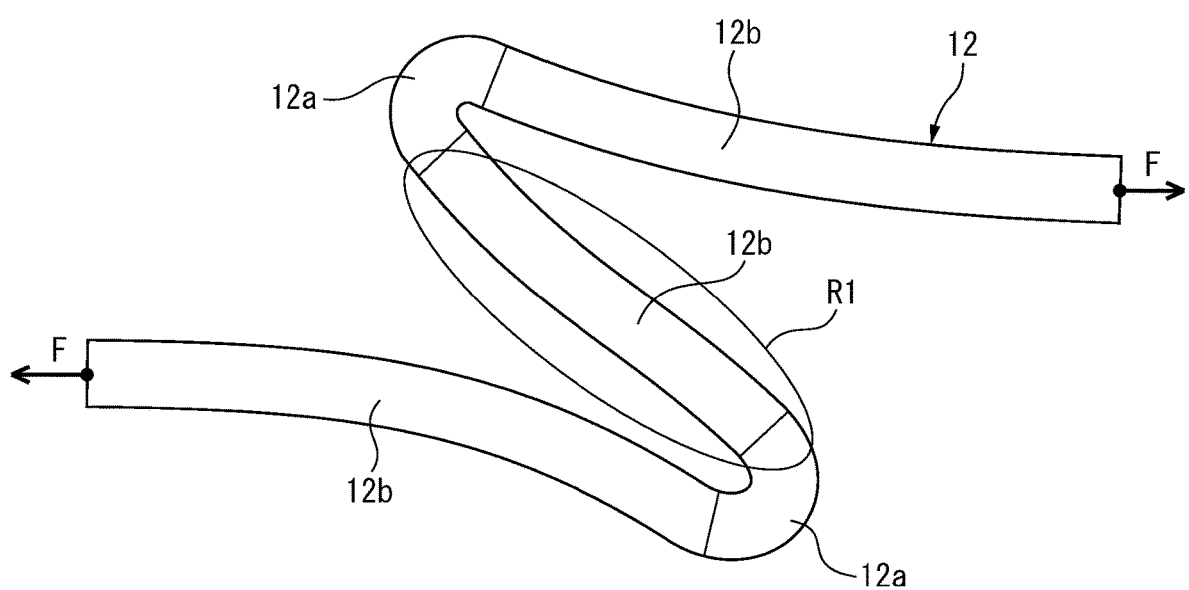
FIG. 6B is a schematic view showing a state of deformation of a sheet member if a tensile load is applied in a first direction of an impact absorbing member if a restraining member is not provided.

FIG. 6A and FIG. 6B are schematic views for explaining the state of deformation of the sheet member 12 in the case where a tensile load is applied in the first direction of the impact absorbing member 10 when a restraining member 14 is not provided. FIG. 6A shows the moment generated when a tensile load is applied in the first direction, while FIG. 6B shows the state of deformation of the sheet member 12 upon application of a tensile load F to the sheet member 12.

As shown in FIG. 6A, if a tensile load F is applied in the first direction, a moment M1 is generated making the superposed sheet parts 12b rotate to the right in the figure about the point O. For this reason, as shown in FIG. 6B, the sheet parts 12b deform while rotating to the right.

As shown in FIG. 6B, if no restraining member 14 is provided, the sheet member 12 ends up deforming while spreading in the thickness direction. For this reason, the sheet member 12 deforms in a direction where the bends are extended at the bent parts 12a. At this time, the region R1 of the sheet member 12 shown in FIG. 6B does not deform much at all but deforms in a direction where only the bent parts 12a are extended, so due to the region R1 not deforming, the reaction force in the case where a tensile load is applied to the sheet member 12 becomes smaller. Due to this, the reaction force at the time when the bends at the bent parts 12a are extended is sufficiently smaller than the reaction force at the time when, in the process shown in FIG. 5A, FIG. 5B, and FIG. 5C, the locations becoming the two bent parts deform while each moving in the first direction toward the inside of the restraining member 14. For this reason, if no restraining member 14 is provided, the reaction force with respect to the tensile load ends up falling and the impact energy becomes insufficiently absorbed. Note that, the restraining member 14 has a strength of an extent enabling occurrence of deformation shown in FIG. 6B to be suppressed.

Figure 13A:
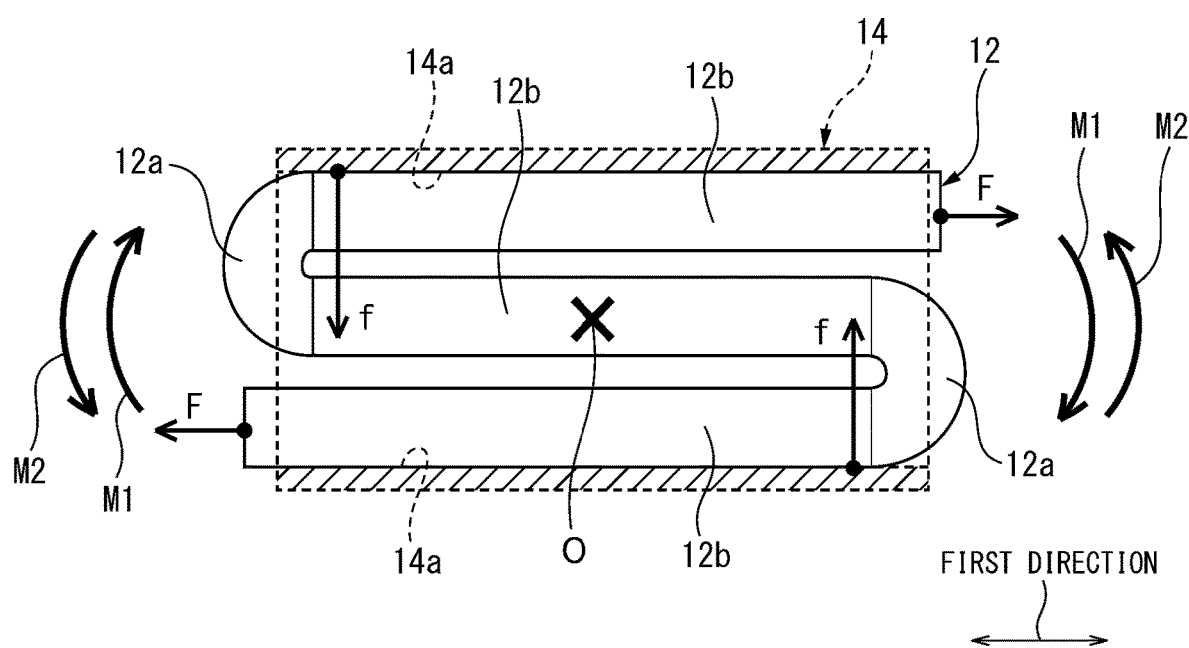
FIG. 13A is a schematic view showing in greater detail a state of deformation of a sheet member if a tensile load is applied in a first direction of an impact absorbing member if a restraining member is provided.
Figure 13B:
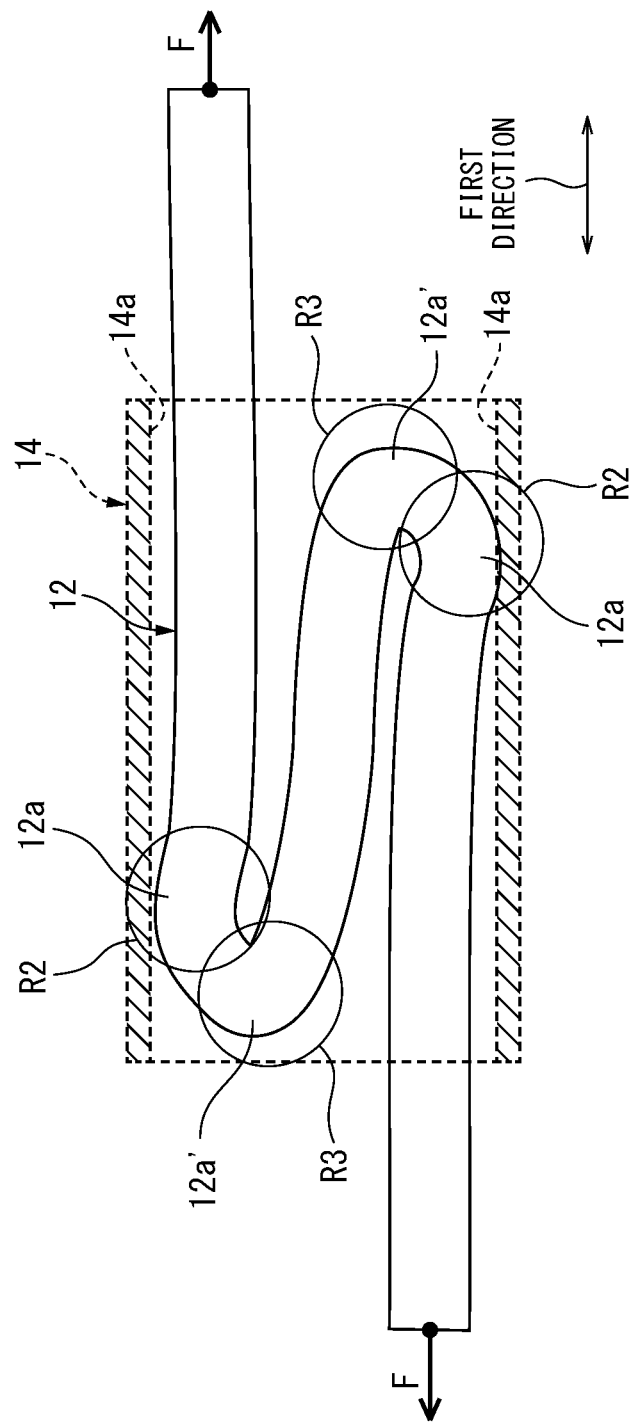
FIG. 13B is a schematic view showing in greater detail a state of deformation of a sheet member if a tensile load is applied in a first direction of an impact absorbing member if a restraining member is provided.

On the other hand, FIG. 13A and FIG. 13B are schematic views showing in greater detail the state of deformation of a sheet member 12 if a tensile load is applied in the first direction of the impact absorbing member 10 in the case where a restraining member 14 is provided. FIG. 13A shows the moment which occurs when a tensile load F is applied in the first direction of the impact absorbing member 10, while FIG. 13B shows the state of deformation of the sheet member 12 upon application of the tensile load F to the sheet member 12.

As shown in FIG. 13A, if the tensile load F is applied in the first direction of the impact absorbing member 10, a moment M1 is generated which would make the superposed sheet parts 12b rotate to the right in the figure about the point O. If the sheet parts 12b try to rotate to the right in the figure due to this, the sheet parts 12b abut against the restraining member 14 whereby the sheet parts 12b receive the force "f" shown in FIG. 15 from the restraining member 14. Due to this, a moment M2 is generated making the superposed sheet parts 12b rotate to the left in the figure about the point O. Therefore, unlike FIG. 6B, there is no deformation of the sheet member 12 in the thickness direction and the sheet parts 12b will not deform while being rotated to the right.

If the clearance between the sheet member 12 and the restraining member 14 is large, when the tensile force F is applied in the first direction of the impact absorbing member 10, the sheet parts 12b rotate to the right in the figure within the range of the clearance until the sheet member 12 abuts against the restraining member 14. Until the sheet member 12 abuts against the restraining member 14, the state is the same as FIG. 6B. If the sheet member 12 abuts against the restraining member 14, the sheet member 12 receives the force "f" shown in FIG. 13A from the restraining member 14 and a large reaction force starts up. Therefore, if like in the present embodiment a moment is generated if an impact load is applied, a drop in the absorbed energy can be suppressed by suitably managing the clearance between the sheet member 12 and the restraining member 14.

As shown in FIG. 13B, in the process of deformation of the sheet member 12 of the impact absorbing member 10, in the regions R2, the bent parts 12a shown in FIG. 15A are extended and in the regions R3, new bent parts 12a' are formed adjoining the original bent parts 12a. In this way, if the original bent parts are extended, new bent parts are formed adjoining the original bent parts. By repetition of this, the deformation is propagated so that the bent parts move. Therefore, the region R1 as shown in FIG. 6B where the sheet member 12 does not deform is not formed and the reaction force when an impact load is applied increases and the absorbed energy becomes larger. Note that, in the present embodiment, the sheet member 12 is used to obtain a sufficient absorbed energy when an impact load is applied, but if hypothetically using a rod member, a sufficient absorbed energy is difficult to obtain.

FIG. 7 is a graph showing a relationship between a stroke and reaction force when applying a tensile load to the impact absorbing member 10. Note that, the "stroke" is the amount of extension of the impact absorbing member 10 when applying a tensile load. The stroke when not applying a tensile load is defined as 0. In FIG. 7, the characteristic C1 showing the relationship between the stroke and reaction force of the impact absorbing member 10 according to the present embodiment (invention example) and the characteristic C2 showing the relationship between the stroke and reaction force of an impact absorbing member according to a comparative example are shown.

Note that, the invention example uses a cold rolled steel sheet comprised of steel sheet having a tensile strength of 1180 MPa as a material and bends the steel sheet to obtain a sheet member 12 having an average thickness "t" of the sheet parts 12b of 1 mm and a width 60 mm of the sheet parts 12b. Further, the comparative example uses a cold rolled steel sheet comprised of steel sheet having a tensile strength of 1180 MPa as a material to obtain a thickness "t" of 1 mm and a width of 60 mm. Further, the length of the restraining member 14 of the invention example in the first direction was made 40 mm. The shape of the invention example, like the impact absorbing member 10 shown in FIG. 2, was made an N-shape having bent parts at two locations. Further, the shape of the comparative example was made a simple sheet shape without folds (without bent parts). In the comparative example, no restraining member 14 was provided.

As shown in FIG. 7, in the characteristic C1 of the invention example, until the stroke became more than 60 mm, the locations forming the two bent parts deformed while moving in the first direction toward the inside of the restraining member 14, whereby a reaction force continuously is generated. On the other hand, in the characteristic C2 of the comparative example, with a stroke of 5 mm or less, the reaction force rapidly rose, then the sheet member broke and the desired reaction force could not be obtained. Note that, in the invention example, a stroke of about two times the length of the restraining member 14 in the first direction can be secured, but if the stroke becomes more than 60 mm, the sheet member 12 becomes on the verge of breakage and calculation is stopped.

FIG. 8 is a graph showing amounts of energy absorbed per volume for the invention example and comparative example explained in FIG. 7. Note that, the amount of absorbed energy is obtained from the integrated value of the reaction forces with respect to the stroke. As shown in FIG. 8, in the invention example, the impact energy was sufficiently absorbed in the process of propagation of deformation of the locations forming the bent parts moving in the first direction toward the inside of the restraining member 14. In other words, in the invention example, deformation of the sheet member 12 is propagated so that the locations forming the bent parts move in the first direction, so the entire region of the sheet member 12 deforms and the amount of energy absorbed per unit volume becomes greater. On the other hand, in the comparative example, at the time of a small stroke, the reaction force rapidly rose, then the sheet member broke early and the desired impact absorbing capability could not be obtained. From the above, it is learned that, according to the invention example, it is possible to absorb greater impact energy by a small occupied space.

As explained above, the restraining surfaces 14a of the restraining member 14 and the outer surface of the sheet member 12 may closely contact each other or a predetermined clearance may be provided. Further, the sheet parts 12b may closely contact each other or, as explained later, a predetermined clearance may be provided between the sheet parts 12b. The greater the clearance between the sheet member 12 and the restraining member 14, the greater the amount of rotating of the sheet parts 12b inside of the restraining member 14 due to the moment M1 explained in FIG. 13A and the larger the region R1 shown in FIG. 6B at which the sheet member 12 does not deform, so the more the reaction force at the time of application of the tensile load falls. Further, the greater the clearance between the sheet parts 12b, the larger the region R1 shown in FIG. 6B at which the sheet member 12 does not deform, so the more the reaction force at the time of application of the tensile load falls. Below, the results of simulation of the preferable numerical ranges for the clearance between the sheet member 12 and the restraining member 14 and the clearance between the inside surfaces of the sheet parts 12b will be explained.

Figure 22:
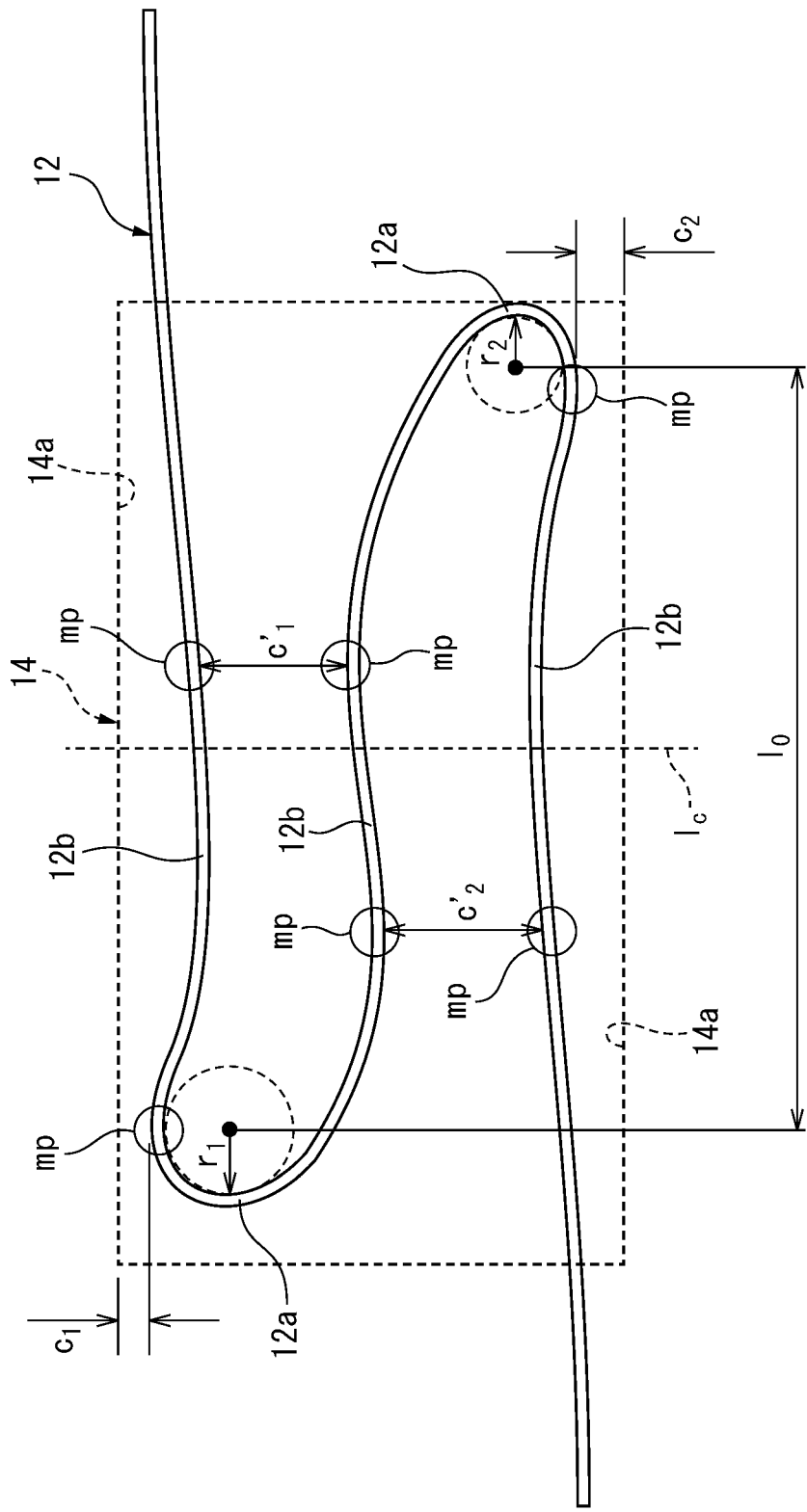
FIG. 22 is a view showing in detail the definitions (methods of measurement) of thickness "t", clearance "c", clearance $c'$, radius of curvature "r", and length $l_0$.

First, as shown in FIG. 14, the thickness "t" of the sheet member 12, clearance "c", clearance c', radius of curvature "r" of the bent parts 12a, and length $l_0$ will be defined. FIG. 22 is a view showing in detail the definitions (methods of measurement) of the thickness "t", clearance "c", clearance c', radius of curvature "r", and length 1p shown in FIG. 14. In FIG. 22, "mp" shows the thickness measurement parts, while the thickness "t" of the sheet member 12 is made the average value of the thicknesses measured at the thickness measurement parts at these six locations.

The clearance "c" is the average value of the clearance $c_1$ of the portion where the sheet part 12b and the restraining surface 14a of the restraining member 14 approach each other the most in the vicinity of one bent part 12a and the clearance $c_2$ of the portion where the sheet part 12b and the restraining surface 14a of the restraining member 14 approach each other the most in the vicinity of the other bent part 12a and corresponds to the clearance between the sheet member 12 and the restraining member 14. The clearance c' is the average value of the clearances $c'_1$, $c'_2$ between the sheet part 12b positioned in the middle among the three sheet parts 12b and each of the two sheet parts 12b positioned at the two sides of the sheet part 12b and corresponds to the clearance between the sheet parts 12b. Further, the radius of curvature "r" is $r=(r_1+r_2+t)/2$ when the radii of the inscribed circles at the insides of the bends of the two bent parts 12a (shown by the broken lines in the figure) are respectively $r_1$ and $r_2$. The radius of curvature "r" corresponds to the radius of curvature of the centerline of thickness. Further, the length $l_0$ is the distance in the first direction between the centers of the inscribed circles at the insides of the bends of the two bent parts 12a and corresponds to the length of the sheet part 12b positioned in the middle in the three sheet parts 12b. The measurement position of the clearance $c'_1$ is preferably separated from the bent part 12a at the left side in the figure and is made the portion where the sheet part 12b and the restraining surface 14a approach the most at the right side from the line $l_c$ showing the position of ½ of the length $l_0$. Similarly, the measurement position of the clearance $c'_2$ is preferably separated from the bent part 12a at the right side in the figure and is made the portion where the sheet part 12b and the restraining surface 14a approach the most at the left side from the line $l_c$ showing the position of ½ of the length $l_0$. The thickness measurement parts mp are the same locations as the locations for measurement of the clearance "c" and clearance c'. In the case of the present example, the thicknesses are measured at the same measurement locations mp as the clearances c1, c2, c'1, and c'2 and the average is made the thickness "t" (also referred to as the "thickness average"). Note that, the length $l_0$ is the length in the state where no impact load is applied (initial state), for example, becomes the length L shown in FIG. 5A ($L=l_0$). Note that, the thickness "t" of the sheet member 12, clearance "c", clearance c', radius of curvature "r" of bent parts 12a, and length $l_0$ are respectively measured at cross section when cutting the impact absorbing member 10 at the position of ½ in the width direction in the first direction. At this time, if the restraining member 14 and the sheet member 12 are not joined, the impact absorbing member 10 as a whole is fixed in place by a resin.

First, the preferable numerical range of the clearance "c" of the sheet member 12 and the restraining member 14 will be explained. As explained in FIG. 13A, if a tensile load F is applied in the first direction of the impact absorbing member 10, a moment M1 is generated centered about the point O. Due to this, the sheet parts 12b try to rotate to the right in the figure, but the sheet member 12 abuts against the restraining member 14, whereby the sheet member 12 receives the force "f" shown in FIG. 13A from the restraining member 14. If the clearance "c" between the sheet member 12 and the restraining member 14 is 0, the sheet parts 12b will not rotate to the right in the restraining member 14.

On the other hand, if the clearance "c" between the sheet member 12 and the restraining member 14 is large, when the tensile load F is applied in the first direction of the impact absorbing member 10, the sheet parts 12b rotate to the right in the figure in the range of the clearance "c". Further, if the sheet member 12 abuts against the restraining member 14, the sheet member 12 receives the force "f" shown in FIG. 13A from the restraining member 14. In this case, until the sheet member 12 abuts against the restraining member 14, deformation similar to FIG. 6B occurs and the reaction force falls.

Figure 15:
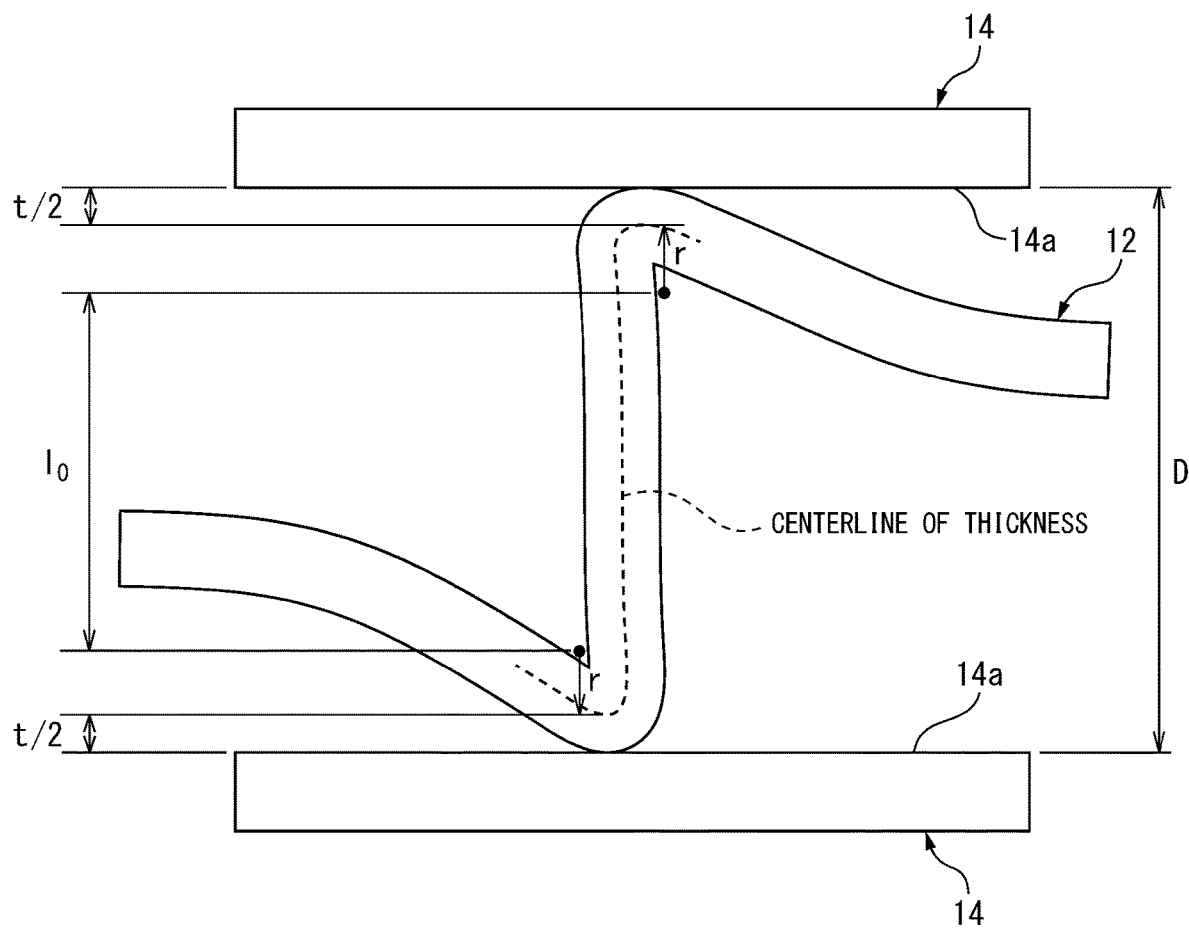
FIG. 15 is a schematic view showing a limit if making a clearance "c" between a sheet member and restraining member larger and if the sheet member and restraining member abut.

If the clearance "c" between the sheet member 12 and the restraining member 14 becomes further larger, when the tensile load F is applied in the first direction of the impact absorbing member 10, the sheet parts 12b further rotate to the right in the figure and sometimes the sheet member 12 no longer abuts against the restraining member 14. In this case, the sheet member 12 does not receive the force "f" shown in FIG. 13A. FIG. 15 is a schematic view showing the limit when making the clearance "c" between the sheet member 12 and the restraining member 14 larger and the sheet member 12 and restraining member 14 abut. The clearance "c" when making the clearance "c" between the sheet member 12 and restraining member 14 larger and the state shown in FIG. 15 occurs, that is, when reaching the limit when the sheet member 12 abuts against the restraining member 14, is defined as the critical clearance c*. From the geometric relationship shown in FIG. 15, the following formula (1) stands.

Distance D between restraining surfaces 14a of restraining member $14 = l_0 + 2(r + t/2)$ (1)

On the other hand, from FIG. 14, the following formula (2) stands.

$$D = 2c^* + 3t + 2(2r - t)$$ (2)

If removing D from formula (1) and formula (2) and solving them for c*, the following formula (3) is obtained. Note that, in formula (2) and formula (3), $2r - t = c'$.

$$c^* = l_0/2 - r = (l_0 - c' - t)/2$$ (3)

For the sheet member 12 to receive the force "f" shown in FIG. 13A, preferably the clearance "c" between the sheet member 12 and the restraining member 14 is made smaller than the critical clearance c*, that is, the ratio c/c* of the clearance "c" with respect to the critical clearance c* is made less than 1. The inventors engaged in intensive studies and as a result found that in a region where the ratio c/c* is less than 1, the absorbed energy of the impact absorbing member 10 when a tensile load is input changes in accordance with the ratio c/c* and that the larger the ratio c/c*, the more reduced the absorbed energy. Furthermore, they learned that if making the ratio c/c* larger, there is a critical point where the absorbed energy rapidly decreases.

Figure 16:
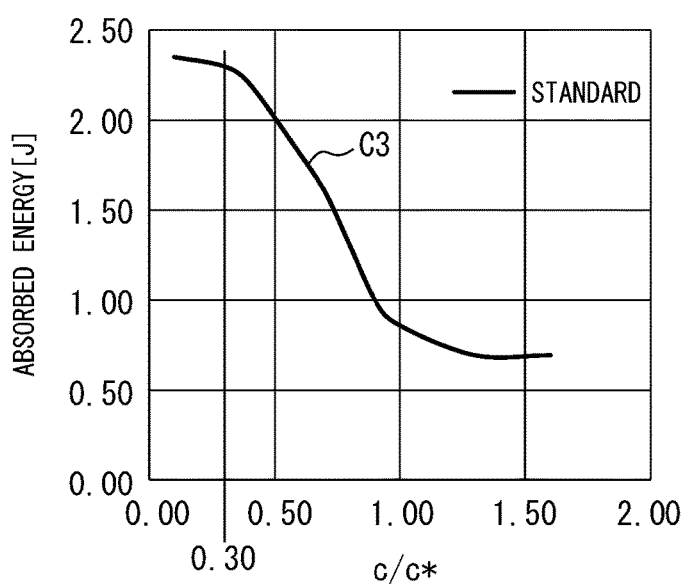
FIG. 16 is a graph calculating by simulation a relationship between a ratio $c/c^*$ of a clearance "c" to a critical clearance $c^*$ and an absorbed energy of the impact absorbing member when applying a tensile load to an impact absorbing member.

FIG. 16 is a graph calculating by simulation the relationship between the ratio c/c* of the clearance "c" to the critical clearance c* and an absorbed energy of the impact absorbing member 10 when applying a tensile load to an impact absorbing member 10. In FIG. 16, the abscissa indicates the ratio c/c* and the ordinate indicates the absorbed energy. The characteristic C3 shown in FIG. 16 was found by simulation of the change of absorbed energy in the case of using as the steel sheet forming the sheet member 12 a cold rolled steel sheet of 1 mm thickness having a tensile strength of 1180 MPa, making the $l_0$ shown in FIG. 14 a value of 10 cm, and changing the ratio c/c*. Note that, the restraining member 14 was simulated as a rigid fixed object.

As shown in FIG. 16, it is learned that in the region where the ratio c/c* is less than 1, the more the clearance "c" increases, that is, the more the ratio c/c* increases, the more the absorbed energy falls, but if c/c* becomes more than 0.3, the rate of decrease of the absorbed energy with respect to an increase of the ratio c/c* becomes greater. In other words, it is learned that the smaller the clearance "c", the more the absorbed energy increases, but if the ratio c/c* is near 0.3, the absorbed energy becomes saturated. Further, if c/c* becomes more than 0.6, the rate of decrease of the absorbed energy with respect to an increase of the ratio c/c* becomes further greater.

Figure 17:
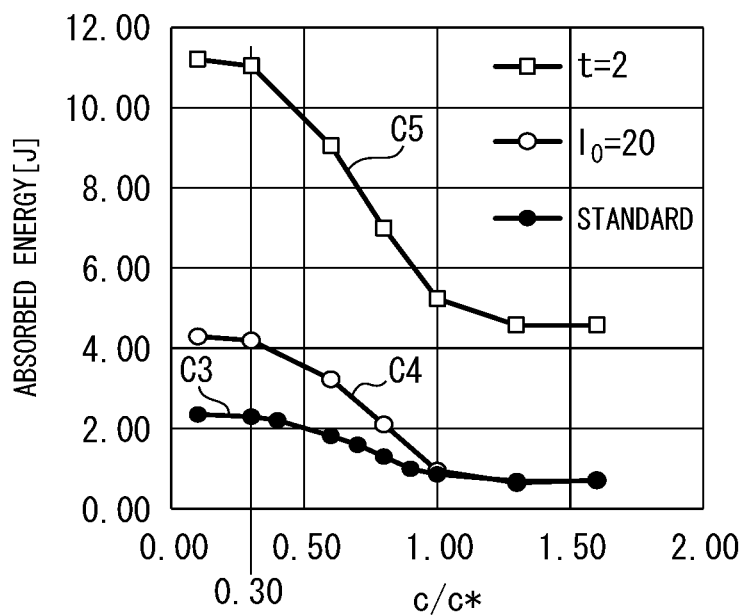
FIG. 17 is a graph calculating and plotting, in addition to a characteristic C3 shown in FIG. 16, a characteristic C4 in the case of making $l_0$ a value of 20 cm and a characteristic C5 in the case of making a thickness of the steel sheet forming the sheet member a value of 2 mm.

FIG. 17 is a graph calculating the plotting, in addition to the characteristic C3 shown in FIG. 16, the characteristic C4 in the case of making $l_0$ a value of 20 cm and the characteristic C5 in the case of making the thickness of the steel sheet forming the sheet member 12 a value of 2 mm. Note that, the characteristic C4 is the same as the characteristic C3 in the conditions other than $l_0$, and the characteristic C5 is the same as the characteristic C3 in the conditions other than the thickness.

As shown in FIG. 17, even in the characteristic C4 in the case of making $l_0$ a value of 20 cm and the characteristic C5 in the case of making the thickness of the steel sheet forming the sheet member 12 a value of 2 mm, it is learned that if c/c* is more than 0.3, the rate of decrease of the absorbed energy with respect to the increase of the ratio c/c* becomes larger. Further, in the characteristic C4 and the characteristic C5 as well, it is learned that if c/c* becomes more than 0.6, the rate of decrease of the absorbed energy with respect to the increase of the ratio c/c* becomes further larger. Therefore, to increase the absorbed energy to raise the impact absorption ability of the impact absorbing member 10, it is suitable to make the value of the ratio c/c* a value of 0.6 or less, more preferably make the value of the ratio c/c* a value of 0.3 or less. Further, to increase the absorbed energy to the maximum extent, it is suitable to make the clearance "c" zero and make the sheet member 12 and the restraining member 14 closely contact each other.

Figure 18:
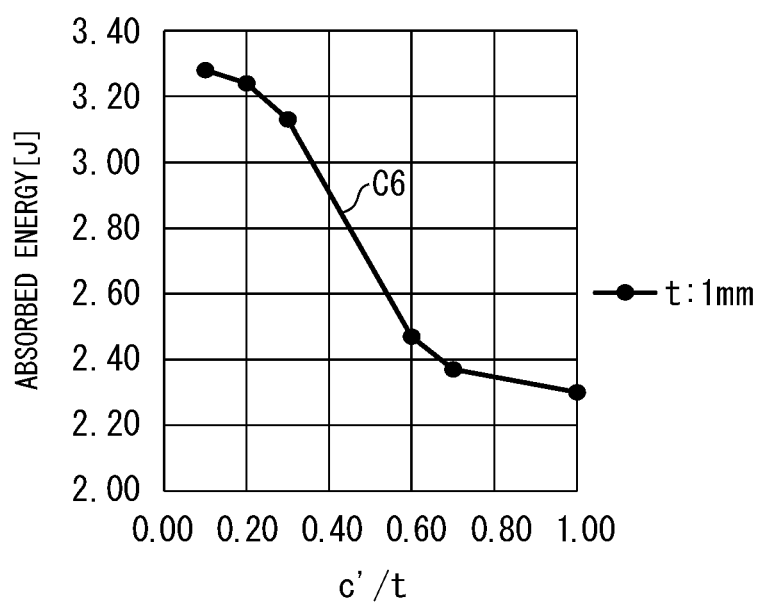
FIG. 18 is a graph calculating by simulation a relationship between a ratio $c'/t$ of a clearance $c'$ of a superposed portion of a sheet member with respect to an average thickness "t" of a plurality of sheet parts and an absorbed energy when applying a tensile load to an impact absorbing member.
Figure 19:
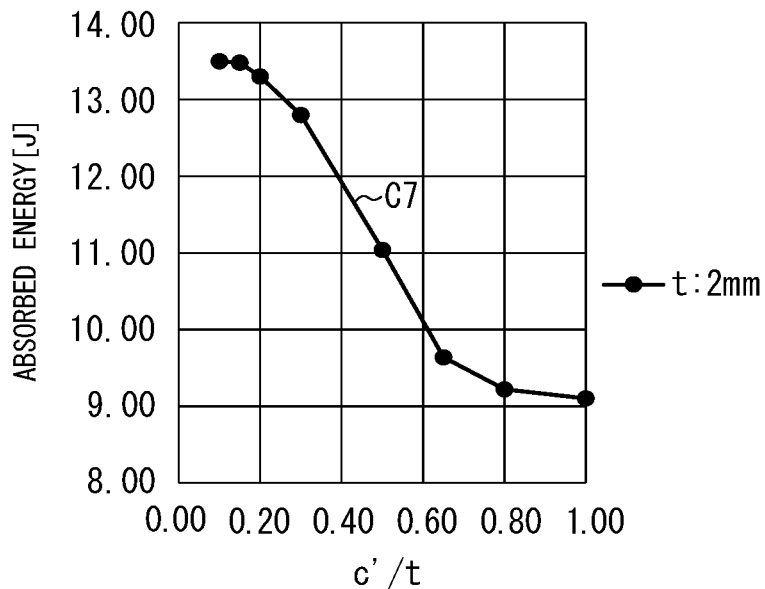
FIG. 19 is a graph calculating by simulation a relationship between a ratio $c'/t$ of a clearance $c'$ of a superposed portion of a sheet member with respect to an average thickness "t" of a plurality of sheet parts and an absorbed energy when applying a tensile load to an impact absorbing member.
Figure 20:
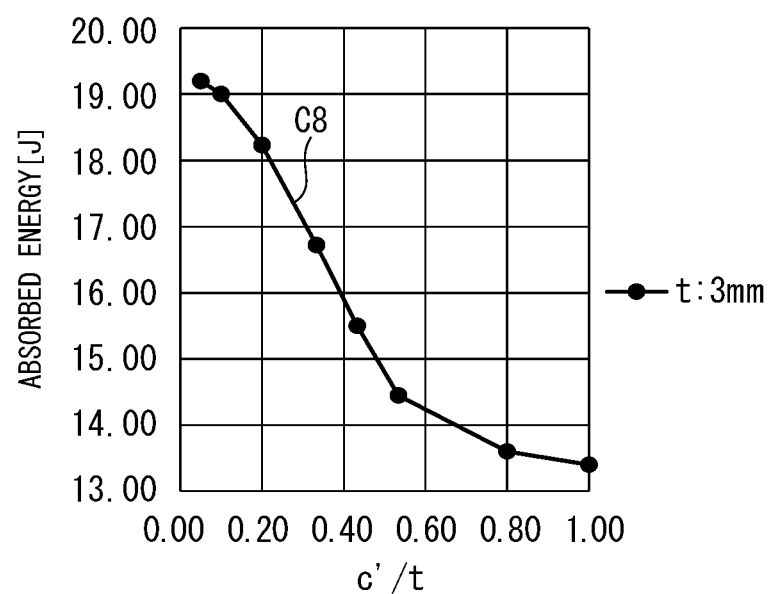
FIG. 20 is a graph calculating by simulation a relationship between a ratio $c'/t$ of a clearance $c'$ of a superposed portion of a sheet member with respect to an average thickness "t" of a plurality of sheet parts and an absorbed energy when applying a tensile load to an impact absorbing member.

Next, the suitable numerical range of the clearance c' of the inside surfaces of the sheet parts 12b will be explained. FIG. 18 to FIG. 20 are graphs calculating by simulation the relationship between the ratio c'/t of the clearance c' of sheet parts 12b with respect to an average thickness "t" of a plurality of sheet parts 12b and an absorbed energy when applying a tensile load to an impact absorbing member 10. In FIG. 18 to FIG. 20, the abscissas show the ratio c'/t and the ordinates show the absorbed energy. The characteristic C6 shown in FIG. 18 was found by simulation of the change of absorbed energy in the case of using as the steel sheet forming the sheet member 12 cold rolled steel sheet of 1 mm thickness having a tensile strength of 1180 MPa and changing the clearance c' between sheet parts 12b. Further, the characteristic C7 shown in FIG. 19 shows the results of simulation in the case of making the thickness of the steel sheet forming the sheet member 12 a value of 2 mm, while the characteristic C8 shown in FIG. 20 shows the results of simulation in the case of making the thickness of the steel sheet forming the sheet member 12 a value of 3 mm. In the simulations of the characteristic C7 shown in FIG. 19 and the characteristic C8 shown in FIG. 20, the conditions other than thicknesses were made the same as the simulation of the characteristic C6 shown in FIG. 18.

As shown in FIG. 18 to FIG. 20, it will be understood that at all thicknesses, the more the clearance c' between the sheet parts 12b increases, that is, the more the ratio c'/t increases, the more the absorbed energy falls, but if c'/t becomes more than 0.2, the rate of decrease of the absorbed energy with respect to the increase of the ratio c'/t becomes larger. In other words, it will be understood that the smaller the clearance c', the more the absorbed energy increases, but more saturated the absorbed energy becomes near the ratio c'/t of 0.2. Therefore, to increase the absorbed energy to raise the impact absorbing capability of the impact absorbing member 10, it is suitable to make the value of the ratio c'/t a value of 0.2 or less. Further, to enlarge the absorbed energy to the maximum extent, it is suitable to make the clearance c' zero and make the sheet parts 12b closely contact each other.

Note that, when the sheet member 12 deforms, bending plastic deformation occurs. The sheet member 12 is required to have a bending ability able to withstand this. The preferable clearance c' of the sheet parts 12b with each other is 20% or less of the thickness "t", so in terms of the radius of curvature "r" of the center line of thickness of the bent part, it is preferable that there be bendability of about r/t=0.6 and in terms of the radius of curvature "r" of the inside of the bend of the bent part, it is preferable that there be bendability of r/t=0.1.

Figure 21A:
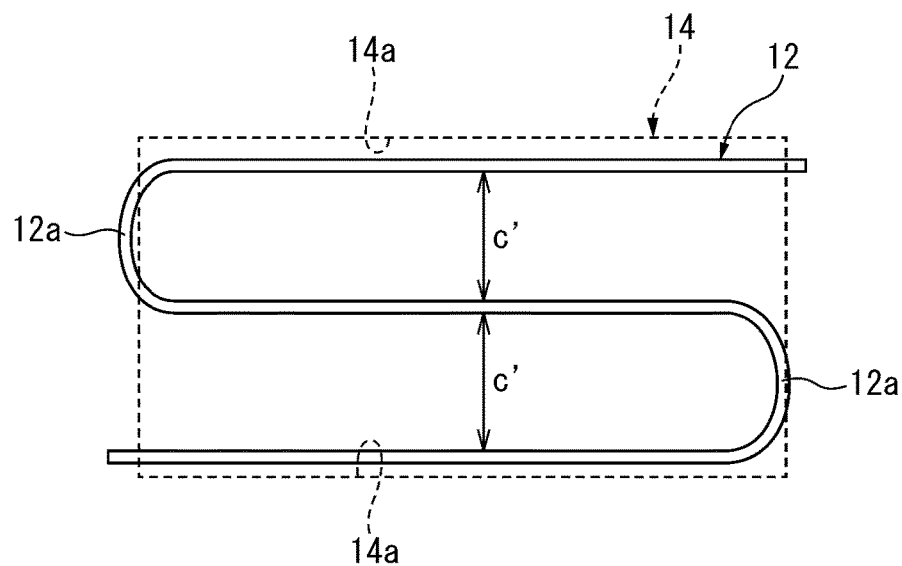
FIG. 21A is a schematic view for explaining the reason why a rate of decrease of absorbed energy with respect to an increase of the ratio $c'/t$ becomes greater if the value of $c'/t$ exceeds 0.2.
Figure 21B:
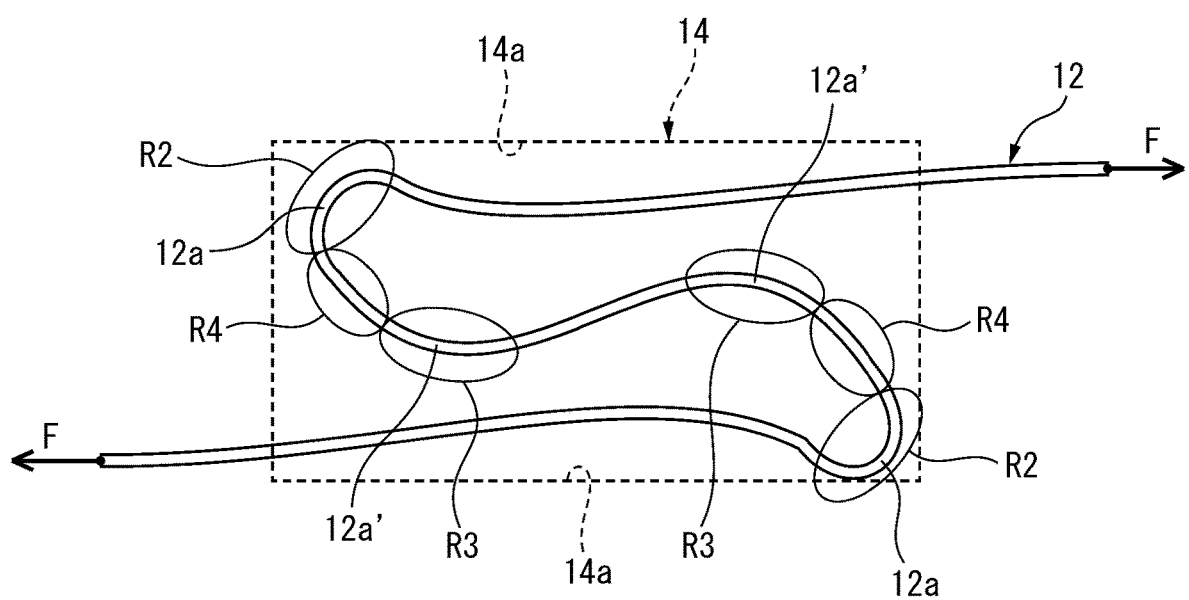
FIG. 21B is a schematic view for explaining the reason why a rate of decrease of the absorbed energy with respect to an increase of the ratio $c'/t$ becomes greater if the value of $c'/t$ is morning than 0.2.

FIG. 21A and FIG. 21B are schematic views for explaining the reason why the rate of decrease of the absorbed energy with respect to the increase of the ratio c'/t becomes larger if the value of c'/t is more than 0.2. FIG. 21A shows the state before a tensile load is applied to the sheet member 12, while FIG. 21B shows the state where the tensile load F is applied to the sheet member 12 and the sheet member 12 deforms. Note that, for convenience in explanation, in FIG. 21A and FIG. 21B, the case is illustrated where c'/t is larger than 1.

As shown in FIG. 21B, in the process of deformation of the sheet member 12 of the impact absorbing member 10, at the regions R2, the bent parts 12a shown in FIG. 21A are extended and new bent parts 12a' are formed at the region R3. At this time, if the ratio c'/t of the clearance c' with respect to the thickness "t" exceeds 0.2, new bent parts 12a' are formed at the regions R3 away from the regions R2 where the bent parts 12a are extended and regions R4 where no bent parts are formed appear between the regions R2 and the regions R3. That is, if the ratio c'/t is 0.2 or less, as explained in FIG. 13B, if the original bent parts 12a are extended, new bent parts 12a' are formed adjoining the original bent parts 12a. By repetition of this, deformation is propagated while the bent parts move, but if the ratio c'/t is more than 0.2, it is believed that new bent parts 12a' are formed at positions away from the original bent parts 12a. Due to this, in the regions R4 between the original bent parts 12a and the new bent parts 12a', the sheet member 12 does not deform, so the absorbed energy falls.

Therefore, to keep new bent parts 12a' from ending up being formed at positions away from the original bent parts 12a, it is preferable to make the ratio c'/t a value of 0.2 or less. Due to this, if an impact load is input, it is possible to keep the absorbed energy from ending up falling.

Modification

Figure 9:
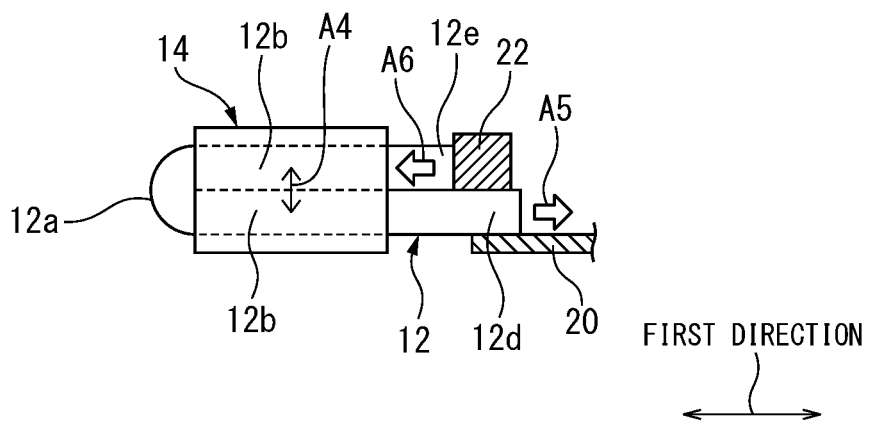
FIG. 9 is a schematic view showing the case where there is a single bent part.

As explained above, there need only be one or more bent parts 12a of the impact absorbing member 10. FIG. 9 is a schematic view showing the case where there is one bent part 12a. In the example shown in FIG. 9, if a load is applied in the first direction in the arrow direction, the bent part 12a deforms while moving to the right. More specifically, in the constitution shown in FIG. 9, if the sheet member 12 receives a tensile load in the arrow A5 direction from the member 20 connected to the end part 12d, force in the arrow A6 direction will be received from the member 22 connected to the end part 12e and the location becoming the bent part will deform in the first direction like moving to the right in the figure and deformation of the sheet member 12 will be propagated.

Note that, in FIG. 9, at the end part 12e, a compressive force is applied in the first direction, so if deformation etc. occurs at the sheet member 12 at the end part 12e, there is a possibility that the energy absorbed in the case of application of an impact load will not be stable. In particular, if the steel sheet forming the sheet member 12 is thin or if the cross-sectional area of the end part 12e is small etc., there is a possibility that deformation etc. will occur at the sheet member 12 at the end part 12e. Further, if there are three or more bent parts 12a, when receiving an impact load and the sheet member 12 deforms, there is a possibility that the superposed portion of the sheet member 12 will easily separate from the restraining member 14 Therefore, it is preferable to make the number of bent parts 12a two parts.

Figure 10:
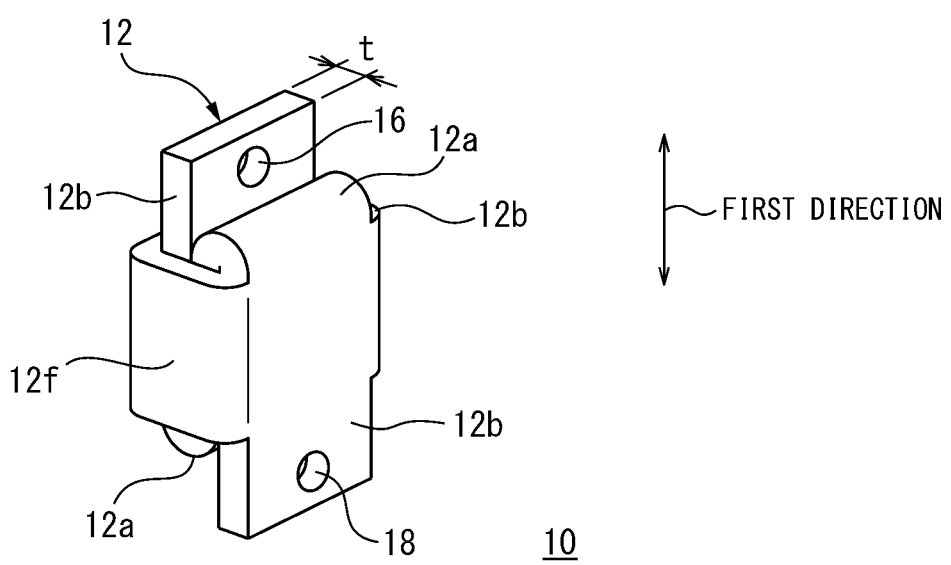
FIG. 10 is a schematic view showing an example of giving a sheet member the function of a restraining member.

FIG. 10 is a schematic view showing an example of giving a sheet member 12 the function of a restraining member 14. In the example shown in FIG. 10, as another example of the restraining member, a restraining piece 12f having a U-shape in the width direction of the sheet member 12 viewed from the first direction is provided. The restraining piece 12f is formed by making the sheet member 12 stick out in the width direction and bending it into a U-shape viewed from the first direction. As shown in FIG. 10, by the restraining piece 12f being provided integrally with the sheet member 12, the number of parts forming the impact absorbing member 10 is cut.

Figure 11:
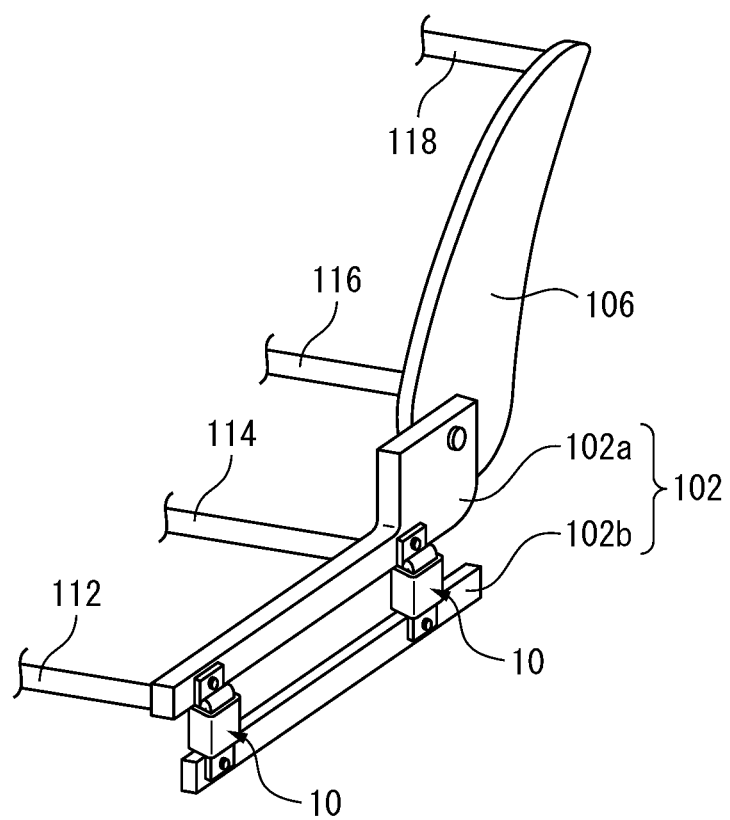
FIG. 11 is a schematic view showing an example of installing an impact absorbing member other than at a hinge part of a vehicular seat.

FIG. 11 is a schematic view showing an example of installing an impact absorbing member 10 other than at a hinge part of a vehicular seat 100. The vehicular seat 100 shown in FIG. 11 has the side frame 102 of the seat cushion 50 divided into an upper side frame 102a and a lower side frame 102b. The upper side frame 102a and the lower side frame 102b are connected by the impact absorbing member 10 according to the present embodiment. The side frame 104 (not shown in FIG. 11) of the seat cushion 50 is also configured in the same way as the side frame 102. According to such a configuration, by dividing the side frames 102, 104 of the seat cushion 50, the side frames 102, 104 are made smaller and further reduction of the weight of the vehicular seat 100 is achieved.

In the configuration shown in FIG. 11, at the time of front impact, the impact energy is absorbed by the seatback 60 deforming to the front of the vehicle and the sheet member 12 of the impact absorbing member 10 at the rear side of the vehicle extending in the first direction. Further, at the time of rear impact, the impact energy is absorbed by the seatback 60 deforming to the rear of the vehicle and the sheet member 12 of the impact absorbing member 10 at the front side of the vehicle extending in the first direction. Further, at the time of side impact, the impact energy is absorbed by the sheet members 12 of the impact absorbing members 10 at the front side of the vehicle and the rear side of the vehicle extending in the first direction.

In the above-mentioned embodiment, the case where a tensile load was applied to the impact absorbing member 10 was explained, but even if a compressive load is applied to the impact absorbing member 10, the impact load is absorbed by a locations forming the bent parts deforming while moving in the first direction and the sheet member 12 of the impact absorbing member 10 contracting in the first direction.

Examples of Application to Other Than Vehicular Seat

Figure 12:
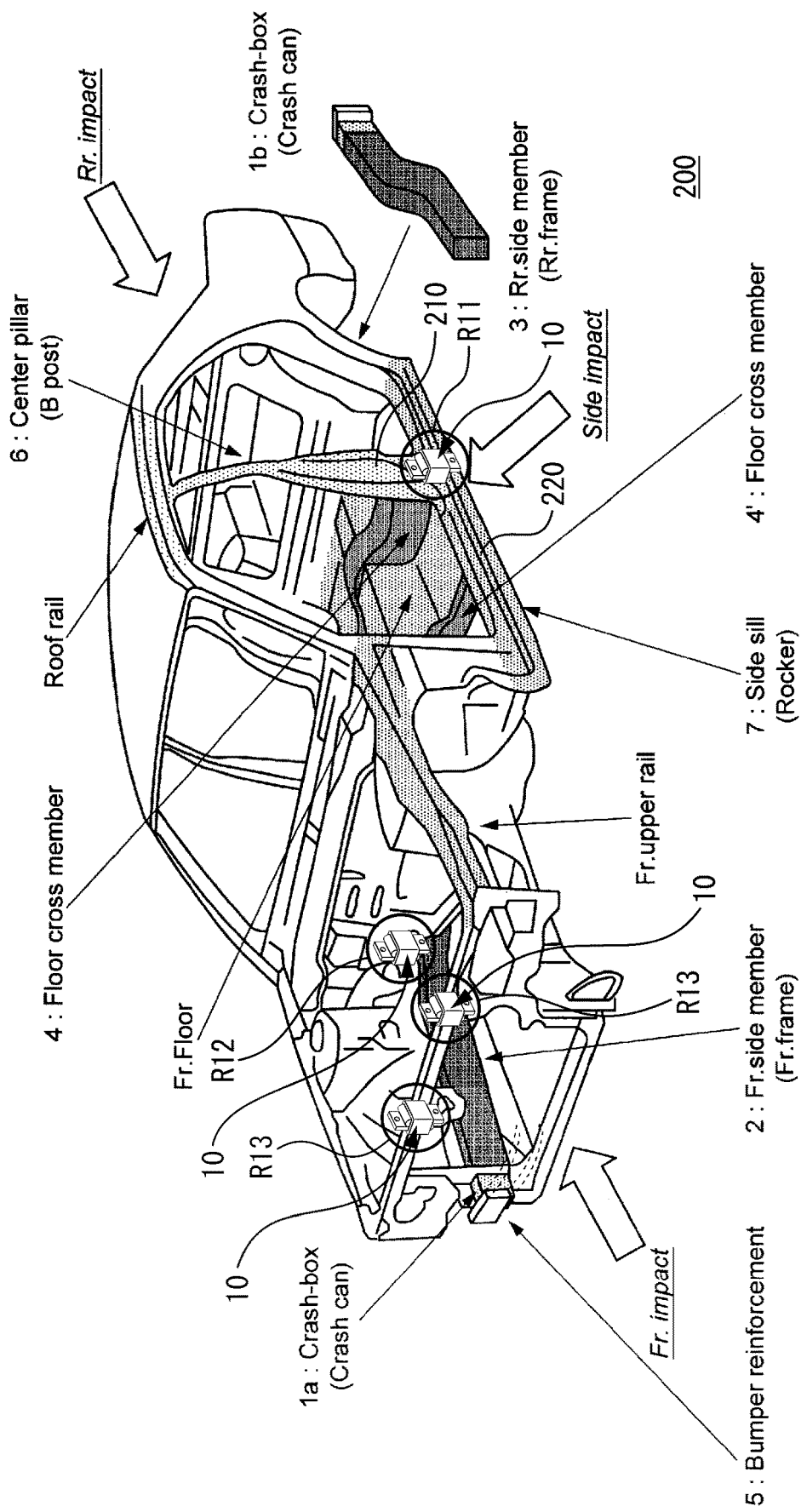
FIG. 12 is a perspective view showing a vehicle body frame of a vehicle and a view showing an example of application of impact absorbing members according to the present embodiment at a region R1, region R2, and region R3 of a vehicle.

In the above-mentioned embodiment, an example where the impact absorbing member 10 was applied to a vehicular seat 100 was shown. On the other hand, the impact absorbing member 10 can be applied to various parts of a vehicle. FIG. 12 is a perspective view showing a vehicle body frame 200 of a vehicle and a view showing an example of application of impact absorbing members according to the present embodiment at a region R11, region R12, and region R13 of a vehicle.

At the region R11, an impact absorbing member 10 is provided at the connecting part of the center pillar 210 and the side sill 220. In this case, one hole 16 of the impact absorbing member 10 is fixed to the center pillar 210, and the other hole 18 of the impact absorbing member 10 is fixed to the side sill 220 side. Due to this configuration, if the center pillar 210 deforms in a direction away from the side sill 220 at the time of a side impact etc., the sheet member 12 of the impact absorbing member 10 extends in the first direction whereby the impact energy is absorbed.

In the region R12, an impact absorbing member 10 is applied to an engine mount of a vehicle. In this case, one of the holes 16 of the impact absorbing member 10 is affixed to the engine (not shown) and the other hole 18 is affixed to the vehicle body frame 200. If the vehicle is in an impact, a large force due to inertial force is applied to the engine, but the sheet member 12 of the impact absorbing member 10 extends in the first direction whereby the impact energy is absorbed.

In the region R13, an impact absorbing member 10 is applied to an opening/closing part of the hood. In this case, one of the holes 16 of the impact absorbing member 10 is affixed to the vehicle body frame 200 while the other hole 18 is affixed to a latch part mechanically engaging with the hood when the hood is closed. For example, if a vehicle strikes a pedestrian, sometimes the head or body of the pedestrian will hit the hood and a force will be applied to a direction pushing down the hood. In such a case, a tensile load is applied to the impact absorbing member 10, and the sheet member 12 of the impact absorbing member 10 extends in the first direction whereby the impact energy is absorbed. Therefore, the safety of the pedestrian is secured.

As explained above, according to the present embodiment, even in the case where space is limited, the impact absorbing member 10 can be installed, so it becomes possible to efficiently absorb impact energy.

REFERENCE SIGNS LIST 10. impact absorbing member
12. sheet member
12a, 12a', 12a". bent parts
12b. sheet parts
12c, 12d, 12e. end parts
12f. restraining pieces
14. restraining member
16, 18. holes
20, 22. members
50. seat cushion
60. seatback
70, 80. hinge parts
72, 82, 84. shafts
100. vehicular seats
102, 104, 106, 108. side frames
102a. upper side frame
102b. lower side frame
110, 112, 114, 116, 118. connecting members
200. vehicle body frame
210. center pillar
220. side sill

The invention claimed is:

1. An impact absorbing member comprising
a sheet member having bent parts and a plurality of sheet parts connected through the bent parts and
a restraining member restraining the plurality of sheet parts,
the plurality of sheet parts being superposed in a state folded back at the bent parts in a first direction,
the restraining member restraining the superposed plurality of sheet parts from both sides in a second direction,
the first direction being a direction connecting one end part among two end parts of the sheet member and the bent part adjoining the sheet part at which the end part is positioned,
the second direction being a direction perpendicular to the first direction,
wherein the bend parts have a curvature, and the outer surface of the bend parts are curved.

2. The impact absorbing member according to claim 1, wherein
the restraining member is a hollow member, and
the superposed plurality of sheet parts are arranged inside the hollow member.

3. The impact absorbing member according to claim 1, wherein
the sheet member has two bent parts and three sheet parts connected through the two bent parts, and
the three sheet parts are superposed in a state alternately folded back at the two bent parts in the first direction.

4. The impact absorbing member according to claim 3, wherein
the second direction is a thickness direction of the sheet member,
the restraining member has two restraining surfaces restraining the superposed plurality of sheet parts in the second direction,
in the second direction, a clearance "c" of an average value of a clearance of a portion where a sheet part and a restraining surface approach the most in the vicinity of one of the bent parts and a clearance of a portion where a sheet part and a restraining surface approach the most in the vicinity of the other of the bent parts satisfies the following formula (1):

$$c/c^* \leq 0.3 \qquad (1)$$

when a length in the first direction of a sheet part positioned at the middle in the second direction among the three sheet parts is $l_0$ and, at a bent part, a radius of curvature of a center line of thickness of a sheet part connected to the bent part is "r", $c^* = l_0/2 - r$.

5. The impact absorbing member according to claim 3, wherein
- the second direction is a thickness direction of the sheet member, and
  - at the superposed plurality of sheet parts, a clearance $c'$ of inside surfaces of sheet parts facing each other in the second direction satisfies the following formula (2) when an average of the thicknesses of the superposed plurality of sheet parts in the second direction is "t":

$$c'/t \leq 0.2 \qquad (2).$$

6. The impact absorbing member according to claim 1, wherein one of the two end parts of the sheet member is connected to a hinge part supporting a seatback of a vehicular use seat and the other is connected to a side frame of a seat cushion.

* * * * *